(12) United States Patent
Partovi

(10) Patent No.: US 11,811,238 B2
(45) Date of Patent: Nov. 7, 2023

(54) INDUCTIVE CHARGING SYSTEM WITH CHARGING ELECTRONICS PHYSICALLY SEPARATED FROM CHARGING COIL

(71) Applicant: Mojo Mobility Inc., Palo Alto, CA (US)

(72) Inventor: Afshin Partovi, Palo Alto, CA (US)

(73) Assignee: Mojo Mobility Inc., Palo Alto, CA (US)

(*) Notice: Subject to any disclaimer, the term of this patent is extended or adjusted under 35 U.S.C. 154(b) by 0 days.

(21) Appl. No.: 17/903,300

(22) Filed: Sep. 6, 2022

(65) Prior Publication Data

US 2022/0416578 A1 Dec. 29, 2022

Related U.S. Application Data

(63) Continuation of application No. 16/782,214, filed on Feb. 5, 2020, now Pat. No. 11,444,485.

(60) Provisional application No. 62/801,529, filed on Feb. 5, 2019.

(51) Int. Cl.
| | |
|---|---|
| H02J 50/00 | (2016.01) |
| H02J 50/12 | (2016.01) |
| H01F 5/00 | (2006.01) |
| H01F 38/14 | (2006.01) |
| H02J 50/70 | (2016.01) |

(52) U.S. Cl.
CPC ............ *H02J 50/005* (2020.01); *H01F 5/003* (2013.01); *H01F 38/14* (2013.01); *H02J 50/12* (2016.02); *H02J 50/70* (2016.02); *H02J 2310/48* (2020.01)

(58) Field of Classification Search
CPC .......... H02J 50/005; H02J 50/12; H02J 50/70; H02J 2310/48; H01F 5/003; H01F 38/14; H01F 27/366
See application file for complete search history.

(56) References Cited

U.S. PATENT DOCUMENTS

| | | |
|---|---|---|
| 3,761,641 A | 9/1973 | Mlinaric |
| 3,806,902 A | 4/1974 | Drees et al. |
| 3,938,018 A | 2/1976 | Dahl |
| 4,311,853 A | 1/1982 | Cree |
| 4,311,953 A | 1/1982 | Fukuda |
| 4,415,959 A | 11/1983 | Vinciarelli |
| 4,720,667 A | 1/1988 | Lee et al. |
| 4,731,585 A | 3/1988 | Fox |
| 4,800,328 A | 1/1989 | Bolger |
| 4,829,277 A | 5/1989 | Stahura et al. |
| 4,873,677 A | 10/1989 | Sakamoto et al. |
| 5,237,257 A | 8/1993 | Johnson |
| 5,311,973 A | 5/1994 | Tseng |
| 5,367,242 A | 11/1994 | Hulman |
| 5,434,493 A | 7/1995 | Woody |

(Continued)

FOREIGN PATENT DOCUMENTS

| | | |
|---|---|---|
| CN | 107636931 A | 1/2018 |
| EP | 2396901 B1 | 12/2019 |

(Continued)

OTHER PUBLICATIONS

US 11,165,259 B2, 11/2021, Peralta (withdrawn)

(Continued)

*Primary Examiner* — Stacy Whitmore
(74) *Attorney, Agent, or Firm* — NK Patent Law

(57) ABSTRACT

An inductive charger where the charging surface or coil is separated from the drive or control electronics is described.

53 Claims, 12 Drawing Sheets

(56) References Cited

U.S. PATENT DOCUMENTS

| | | |
|---|---|---|
| 5,455,466 A | 10/1995 | Parks et al. |
| 5,543,702 A | 8/1996 | Pfeiffer |
| 5,550,452 A | 8/1996 | Shirai |
| 5,600,225 A | 2/1997 | Goto |
| 5,642,087 A | 6/1997 | Crow |
| 5,656,917 A | 8/1997 | Theobald |
| 5,696,433 A | 12/1997 | Palino |
| 5,734,254 A | 3/1998 | Stephens |
| 5,744,933 A | 4/1998 | Inoue |
| 5,803,744 A | 9/1998 | Yen |
| 5,889,384 A | 5/1999 | Hayes |
| 5,925,814 A | 7/1999 | Tsuzuki |
| 5,952,814 A | 9/1999 | Van Lerberghe |
| 5,959,433 A | 9/1999 | Rohde |
| 5,963,012 A | 10/1999 | Garcia |
| 5,991,170 A | 11/1999 | Nagai |
| 5,991,665 A | 11/1999 | Wang |
| 6,008,622 A | 12/1999 | Nakawatase |
| 6,016,046 A | 1/2000 | Kaile et al. |
| 6,028,413 A | 2/2000 | Brockmann |
| 6,040,680 A | 3/2000 | Toya et al. |
| 6,057,668 A | 5/2000 | Chao |
| 6,094,119 A | 7/2000 | Reznik |
| 6,118,249 A | 9/2000 | Brockman et al. |
| 6,178,353 B1 | 1/2001 | Griffith et al. |
| 6,184,651 B1 | 2/2001 | Fernandez et al. |
| 6,184,654 B1 | 2/2001 | Bachner |
| 6,208,115 B1 | 3/2001 | Binder |
| 6,301,128 B1 | 10/2001 | Jang et al. |
| 6,310,465 B2 | 10/2001 | Najima |
| 6,324,430 B1 | 11/2001 | Zarinetchi et al. |
| 6,331,744 B1 | 12/2001 | Chen |
| 6,436,299 B1 | 8/2002 | Baarman |
| 6,462,509 B1 | 10/2002 | Abe |
| 6,489,745 B1 | 12/2002 | Koreis |
| 6,498,455 B2 | 12/2002 | Zink |
| 6,501,364 B1 | 12/2002 | Hui |
| 6,527,971 B1 | 3/2003 | Nakamura et al. |
| 6,573,817 B2 | 6/2003 | Gottschalk |
| 6,586,909 B1 | 7/2003 | Trepka |
| 6,625,477 B1 | 9/2003 | Wakefield |
| 6,636,017 B2 | 10/2003 | Zink et al. |
| 6,650,088 B1 | 11/2003 | Webb |
| 6,673,250 B2 | 1/2004 | Kuennen |
| 6,697,272 B2 | 2/2004 | Nanbu |
| 6,731,071 B2 | 5/2004 | Baarman |
| 6,741,064 B2 | 5/2004 | Liu |
| 6,756,656 B2 | 6/2004 | Lowther |
| 6,756,765 B2 | 6/2004 | Bruning |
| 6,765,144 B1 | 7/2004 | Wang et al. |
| 6,798,716 B1 | 9/2004 | Charych |
| 6,803,744 B1 | 10/2004 | Sabo |
| 6,803,774 B2 | 10/2004 | Park |
| 6,806,649 B2 | 10/2004 | Mollema |
| 6,812,645 B2 | 11/2004 | Baarman |
| 6,825,620 B2 | 11/2004 | Kuennen |
| 6,831,417 B2 | 12/2004 | Baarman |
| 6,831,544 B2 | 12/2004 | Patel et al. |
| 6,844,702 B2 | 1/2005 | Giannopoulos |
| 6,869,019 B1 | 3/2005 | Nagi et al. |
| 6,870,089 B1 | 3/2005 | Gray |
| 6,888,438 B2 | 5/2005 | Hui |
| 6,906,495 B2 | 6/2005 | Cheng |
| 6,913,477 B2 | 7/2005 | Dayan |
| 6,917,163 B2 | 7/2005 | Baarman |
| 6,917,182 B2 | 7/2005 | Burton |
| 6,943,733 B2 | 9/2005 | Vance |
| 6,972,543 B1 | 12/2005 | Wells |
| 6,975,198 B2 | 12/2005 | Baarman |
| 7,026,789 B2 | 4/2006 | Bozzone |
| 7,031,662 B2 | 4/2006 | Suzuki |
| 7,042,196 B2 | 5/2006 | Ka-Lai |
| 7,116,200 B2 | 10/2006 | Baarman |
| 7,118,240 B2 | 10/2006 | Baarman |
| 7,126,450 B2 | 10/2006 | Baarman |
| 7,132,918 B2 | 11/2006 | Baarman |
| 7,151,357 B2 | 12/2006 | Xian |
| 7,162,264 B2 | 1/2007 | Vance |
| 7,164,245 B1 | 1/2007 | Chen |
| 7,164,255 B2 | 1/2007 | Hui |
| 7,183,870 B2 | 2/2007 | Takagi |
| 7,184,706 B2 | 2/2007 | Someya |
| 7,209,084 B2 | 4/2007 | Lindell |
| 7,211,986 B1 | 5/2007 | Flowerdew et al. |
| 7,221,919 B2 | 5/2007 | Takagi |
| 7,239,110 B2 | 7/2007 | Cheng |
| 7,248,017 B2 | 7/2007 | Cheng et al. |
| 7,305,258 B2 | 12/2007 | Rydgren |
| 7,311,526 B2 | 12/2007 | Rohrbach et al. |
| 7,324,051 B2 | 1/2008 | Hayes |
| 7,331,793 B2 | 2/2008 | Hernandez et al. |
| 7,336,054 B2 | 2/2008 | Crisp |
| 7,342,539 B2 | 3/2008 | Rosenberg |
| 7,352,567 B2 | 4/2008 | Hotelling et al. |
| 7,355,150 B2 | 4/2008 | Baarman |
| 7,375,493 B2 | 5/2008 | Calhoon et al. |
| 7,376,408 B2 | 5/2008 | Hayes |
| 7,378,817 B2 | 5/2008 | Calhoon |
| 7,382,636 B2 | 6/2008 | Baarman |
| 7,385,357 B2 | 6/2008 | Kuennen |
| 7,388,543 B2 | 6/2008 | Vance |
| 7,399,202 B2 | 7/2008 | Dayan |
| 7,415,248 B2 | 8/2008 | Andersson et al. |
| 7,443,135 B2 | 10/2008 | Cho |
| 7,462,951 B1 | 12/2008 | Baarman |
| 7,477,195 B2 | 1/2009 | Vance |
| 7,487,921 B2 | 2/2009 | Takahashi |
| 7,495,414 B2 | 2/2009 | Hui |
| 7,498,871 B2 | 3/2009 | Ruuswik |
| 7,514,765 B2 | 4/2009 | Huang et al. |
| 7,525,283 B2 | 4/2009 | Cheng |
| 7,554,316 B2 | 6/2009 | Stevens |
| 7,576,514 B2 | 8/2009 | Hui |
| 7,605,496 B2 | 10/2009 | Stevens |
| D603,603 S | 11/2009 | Laine |
| D607,879 S | 1/2010 | Ferber |
| 7,645,143 B2 | 1/2010 | Rohrbach |
| D611,407 S | 3/2010 | Webb |
| D611,408 S | 3/2010 | Ferber |
| 7,733,215 B2 | 6/2010 | Kozuma et al. |
| 7,741,734 B2 | 6/2010 | Joannopoulos |
| 7,781,916 B2 | 8/2010 | Boys |
| D624,316 S | 9/2010 | Ferber |
| 7,804,054 B2 | 9/2010 | Shalom |
| D625,721 S | 10/2010 | Ferber |
| 7,825,543 B2 | 11/2010 | Karalis |
| 7,855,529 B2 | 12/2010 | Liu |
| 7,872,445 B2 | 1/2011 | Hui |
| 7,906,936 B2 | 3/2011 | Azancot |
| 7,915,858 B2 | 3/2011 | Liu |
| D636,333 S | 4/2011 | Kulikowski |
| 7,948,208 B2 | 5/2011 | Partovi |
| 7,952,322 B2 | 5/2011 | Partovi |
| D639,734 S | 6/2011 | Ferber |
| 3,040,103 A1 | 10/2011 | Hui |
| 8,035,255 B2 | 10/2011 | Kurs |
| 8,049,370 B2 | 11/2011 | Azancot |
| 8,050,068 B2 | 11/2011 | Hussmann |
| 8,069,100 B2 | 11/2011 | Taylor et al. |
| 8,234,189 B2 | 1/2012 | Taylor et al. |
| 8,115,448 B2 | 2/2012 | John |
| 8,169,185 B2 | 5/2012 | Partovi |
| 8,234,509 B2 | 7/2012 | Gioscia et al. |
| 8,242,741 B2 | 8/2012 | Phelps, III |
| 8,290,463 B2 | 10/2012 | Liu et al. |
| 8,554,165 B2 | 10/2013 | Liu et al. |
| 8,629,651 B2 | 1/2014 | Guccione et al. |
| 8,766,484 B2 | 7/2014 | Baarman et al. |
| 9,084,343 B2 | 7/2015 | Wallenschmidt |
| 9,407,327 B2 | 8/2016 | Kirby et al. |
| 9,722,449 B2 | 8/2017 | Jung |
| 9,793,738 B2 | 10/2017 | Jacobs et al. |
| 9,795,069 B2 | 10/2017 | Wallenschmidt |
| 9,837,846 B2 | 12/2017 | Partovi |

(56) References Cited

U.S. PATENT DOCUMENTS

| | | |
|---|---|---|
| 10,115,520 B2 | 10/2018 | Partovi |
| 10,141,770 B2 | 11/2018 | Partovi |
| 10,622,847 B2 | 4/2020 | Takatsu et al. |
| 11,018,524 B2 | 5/2021 | Simpson et al. |
| 11,095,153 B2 | 8/2021 | Zeine |
| 11,164,141 B1 | 11/2021 | Bolton et al. |
| 11,164,614 B1 | 11/2021 | Jain |
| 11,165,272 B2 | 11/2021 | Winkler |
| 11,165,976 B2 | 11/2021 | Kobayashi |
| 11,165,980 B2 | 11/2021 | Hashimoto et al. |
| 2002/0004167 A1 | 1/2002 | Jenson |
| 2002/0067238 A1 | 6/2002 | Leu |
| 2002/0089305 A1 | 7/2002 | Park |
| 2002/0093309 A1 | 7/2002 | Peele |
| 2003/0025417 A1 | 2/2003 | Rose |
| 2003/0094921 A1 | 5/2003 | Lau |
| 2003/0103039 A1 | 6/2003 | Burr |
| 2003/0210106 A1 | 11/2003 | Cheng |
| 2003/0214255 A1 | 11/2003 | Baarman |
| 2004/0113589 A1 | 6/2004 | Crisp |
| 2004/0130915 A1 | 7/2004 | Baarman |
| 2004/0130916 A1 | 7/2004 | Baarman |
| 2004/0145342 A1 | 7/2004 | Lyon |
| 2004/0145343 A1 | 7/2004 | Naskali |
| 2004/0150934 A1 | 8/2004 | Baarman et al. |
| 2004/0222751 A1 | 11/2004 | Mollema |
| 2004/0232845 A1 | 11/2004 | Baarman |
| 2005/0007067 A1 | 1/2005 | Baarman |
| 2005/0017677 A1 | 1/2005 | Burton |
| 2005/0062567 A1 | 3/2005 | Zimmerling et al. |
| 2005/0063488 A1 | 3/2005 | Troyk |
| 2005/0068019 A1 | 3/2005 | Nakamura et al. |
| 2005/0075696 A1 | 4/2005 | Forsberg |
| 2005/0075699 A1 | 4/2005 | Olson et al. |
| 2005/0093475 A1 | 5/2005 | Kuennen |
| 2005/0116650 A1 | 6/2005 | Baarman |
| 2005/0116683 A1 | 6/2005 | Cheng |
| 2005/0122058 A1 | 6/2005 | Baarman |
| 2005/0122059 A1 | 6/2005 | Baarman |
| 2005/0127849 A1 | 6/2005 | Baarman |
| 2005/0127850 A1 | 6/2005 | Baarman |
| 2005/0127867 A1 | 6/2005 | Calhoon |
| 2005/0127869 A1 | 6/2005 | Calhoon |
| 2005/0135122 A1 | 6/2005 | Cheng |
| 2005/0140482 A1 | 6/2005 | Cheng |
| 2005/0162125 A1 | 7/2005 | Yu |
| 2005/0189910 A1 | 9/2005 | Hui |
| 2005/0257855 A1 | 11/2005 | Kim |
| 2006/0021926 A1 | 2/2006 | Woodard |
| 2006/0038794 A1 | 2/2006 | Schneidman |
| 2006/0061324 A1 | 3/2006 | Oglesbee |
| 2006/0105718 A1 | 5/2006 | Ozluturk |
| 2006/0106965 A1 | 5/2006 | Falcon |
| 2006/0108977 A1 | 5/2006 | Kagermeier |
| 2006/0132045 A1 | 6/2006 | Baarman |
| 2006/0146517 A1 | 7/2006 | Park |
| 2006/0202665 A1 | 9/2006 | Hsu |
| 2006/0205381 A1 | 9/2006 | Beart |
| 2006/0238930 A1 | 10/2006 | Baarman |
| 2006/0284593 A1 | 12/2006 | Nagy |
| 2007/0004168 A1 | 1/2007 | Zips |
| 2007/0029965 A1 | 2/2007 | Hui |
| 2007/0069687 A1 | 3/2007 | Suzuki |
| 2007/0103110 A1 | 5/2007 | Sagoo |
| 2007/0109708 A1 | 5/2007 | Hussman |
| 2007/0139000 A1 | 6/2007 | Kozuma |
| 2007/0145830 A1 | 6/2007 | Lee et al. |
| 2007/0178945 A1 | 8/2007 | Cook et al. |
| 2007/0182367 A1 | 8/2007 | Partovi |
| 2007/0236174 A1 | 10/2007 | Kaye |
| 2007/0279002 A1 | 12/2007 | Partovi |
| 2007/0296393 A1 | 12/2007 | Malpas |
| 2008/0014897 A1 | 1/2008 | Cook |
| 2008/0061733 A1 | 3/2008 | Toya |
| 2008/0067874 A1 | 3/2008 | Tseng |
| 2008/0164839 A1 | 7/2008 | Kato |
| 2008/0247210 A1 | 10/2008 | Hu |
| 2008/0258679 A1 | 10/2008 | Manico |
| 2008/0272889 A1 | 11/2008 | Symons |
| 2008/0278264 A1 | 11/2008 | Karalis |
| 2009/0001941 A1 | 1/2009 | Hsu et al. |
| 2009/0015075 A1 | 1/2009 | Cook |
| 2009/0021212 A1 | 1/2009 | Hasegawa et al. |
| 2009/0027149 A1 | 1/2009 | Kocijan |
| 2009/0033564 A1 | 2/2009 | Cook |
| 2009/0043727 A1 | 2/2009 | Cohen., Jr. |
| 2009/0045773 A1 | 2/2009 | Pandya et al. |
| 2009/0049554 A1 | 2/2009 | Vuong |
| 2009/0058189 A1 | 3/2009 | Cook |
| 2009/0058361 A1 | 3/2009 | John |
| 2009/0072627 A1 | 3/2009 | Cook |
| 2009/0072628 A1 | 3/2009 | Cook |
| 2009/0072629 A1 | 3/2009 | Cook |
| 2009/0079268 A1 | 3/2009 | Cook |
| 2009/0096413 A1 | 4/2009 | Partovi |
| 2009/0102292 A1 | 4/2009 | Cook |
| 2009/0127937 A1 | 5/2009 | Widmer |
| 2009/0134712 A1 | 5/2009 | Cook |
| 2009/0140692 A1 | 6/2009 | Hwang |
| 2009/0167449 A1 | 7/2009 | Cook |
| 2009/0174263 A1 | 7/2009 | Baarman et al. |
| 2009/0195332 A1 | 8/2009 | Joannopoulos |
| 2009/0195333 A1 | 8/2009 | Joannopoulos |
| 2009/0212636 A1 | 8/2009 | Cook |
| 2009/0212637 A1 | 8/2009 | Baarman et al. |
| 2009/0212639 A1 | 8/2009 | Johnson |
| 2009/0213028 A1 | 8/2009 | Cook |
| 2009/0224608 A1 | 9/2009 | Cook |
| 2009/0224609 A1 | 9/2009 | Cook |
| 2009/0224856 A1 | 9/2009 | Karalis |
| 2009/0230777 A1 | 9/2009 | Baarman et al. |
| 2009/0243397 A1 | 10/2009 | Cook |
| 2009/0244836 A1 | 10/2009 | Leng et al. |
| 2009/0250574 A1 | 10/2009 | Fullerton et al. |
| 2009/0257259 A1 | 10/2009 | Leibovitz |
| 2009/0267709 A1 | 10/2009 | Joannopoulos |
| 2009/0267710 A1 | 10/2009 | Joannopoulos |
| 2009/0278494 A1 | 11/2009 | Randall |
| 2009/0284083 A1 | 11/2009 | Karalis |
| 2009/0284227 A1 | 11/2009 | Mohammadian |
| 2010/0007307 A1 | 1/2010 | Baarman |
| 2010/0013431 A1 | 1/2010 | Liu |
| 2010/0038970 A1 | 2/2010 | Cook |
| 2010/0066176 A1 | 3/2010 | Azancot |
| 2010/0070219 A1 | 3/2010 | Azancot |
| 2010/0072825 A1 | 3/2010 | Azancot |
| 2010/0073177 A1 | 3/2010 | Azancot |
| 2010/0081377 A1 | 4/2010 | Chatterjee et al. |
| 2010/0081473 A1 | 4/2010 | Chatterjee |
| 2010/0096934 A1 | 4/2010 | Joannopoulos |
| 2010/0102639 A1 | 4/2010 | Joannopoulos |
| 2010/0102640 A1 | 4/2010 | Joannopoulos |
| 2010/0102641 A1 | 4/2010 | Joannopoulos |
| 2010/0109443 A1 | 5/2010 | Cook |
| 2010/0109445 A1 | 5/2010 | Kurs |
| 2010/0117454 A1 | 5/2010 | Cook |
| 2010/0117455 A1 | 5/2010 | Joannopoulos |
| 2010/0117456 A1 | 5/2010 | Karalis |
| 2010/0117596 A1 | 5/2010 | Cook |
| 2010/0123353 A1 | 5/2010 | Joannopoulos |
| 2010/0123354 A1 | 5/2010 | Joannopoulos |
| 2010/0123355 A1 | 5/2010 | Joannopoulos et al. |
| 2010/0127573 A1 | 5/2010 | Joannopoulos |
| 2010/0127574 A1 | 5/2010 | Joannopoulos |
| 2010/0127575 A1 | 5/2010 | Joannopoulos |
| 2010/0127660 A1 | 5/2010 | Cook |
| 2010/0133918 A1 | 6/2010 | Joannopoulos |
| 2010/0133919 A1 | 6/2010 | Joannopoulos |
| 2010/0133920 A1 | 6/2010 | Joannopoulos |
| 2010/0141042 A1 | 6/2010 | Kesler |
| 2010/0146308 A1 | 6/2010 | Gioscia et al. |
| 2010/0148589 A1 | 6/2010 | Hamam |
| 2010/0164296 A1 | 7/2010 | Kurs |
| 2010/0164297 A1 | 7/2010 | Kurs |

(56) References Cited

U.S. PATENT DOCUMENTS

| | | |
|---|---|---|
| 2010/0164298 A1 | 7/2010 | Karalis |
| 2010/0171368 A1 | 7/2010 | Schatz |
| 2010/0171369 A1 | 7/2010 | Taylor et al. |
| 2010/0181841 A1 | 7/2010 | Azancot |
| 2010/0181843 A1 | 7/2010 | Schatz |
| 2010/0181845 A1 | 7/2010 | Fiorello |
| 2010/0184371 A1 | 7/2010 | Cook |
| 2010/0187911 A1 | 7/2010 | Joannopoulos |
| 2010/0190435 A1 | 7/2010 | Cook |
| 2010/0190436 A1 | 7/2010 | Cook |
| 2010/0194336 A1 | 8/2010 | Azancot |
| 2010/0201313 A1 | 8/2010 | Vorenkamp |
| 2010/0207572 A1 | 8/2010 | Kirby |
| 2010/0207771 A1 | 8/2010 | Trigiani |
| 2010/0213895 A1 | 8/2010 | Keating |
| 2010/0219183 A1 | 9/2010 | Azancot |
| 2010/0219693 A1 | 9/2010 | Azancot |
| 2010/0219697 A1 | 9/2010 | Azancot |
| 2010/0219698 A1 | 9/2010 | Azancot |
| 2010/0230301 A1 | 9/2010 | Fellig |
| 2010/0235006 A1 | 9/2010 | Brown |
| 2010/0244584 A1 | 9/2010 | Azancot |
| 2010/0253281 A1 | 10/2010 | Li |
| 2010/0253282 A1 | 10/2010 | Azancot |
| 2010/0257382 A1 | 10/2010 | Azancot |
| 2010/0259401 A1 | 10/2010 | Azancot |
| 2010/0264871 A1 | 10/2010 | Matouka et al. |
| 2010/0277120 A1 | 11/2010 | Cook |
| 2010/0277121 A1 | 11/2010 | Hall |
| 2010/0314946 A1 | 12/2010 | Budde |
| 2010/0327804 A1 | 12/2010 | Takahashi |
| 2011/0012556 A1 | 1/2011 | Lai |
| 2011/0050164 A1 | 3/2011 | Partovi |
| 2011/0057606 A1 | 3/2011 | Saunamaki |
| 2011/0062793 A1 | 3/2011 | Azancot |
| 2011/0090723 A1 | 4/2011 | Hu |
| 2011/0095617 A1 | 4/2011 | Cook |
| 2011/0115430 A1 | 5/2011 | Saunamaki |
| 2011/0121660 A1 | 5/2011 | Azancot |
| 2011/0157137 A1 | 6/2011 | Ben-Shalom |
| 2011/0187318 A1 | 8/2011 | Hui |
| 2011/0193520 A1 | 8/2011 | Yamazaki |
| 2011/0202777 A1 | 8/2011 | Hijazi et al. |
| 2011/0217927 A1 | 9/2011 | Ben-Shalom |
| 2011/0221387 A1 | 9/2011 | Steigerwald |
| 2011/0221391 A1 | 9/2011 | Won |
| 2011/0222493 A1 | 9/2011 | Mangold |
| 2011/0266878 A9 | 11/2011 | Cook |
| 2012/0041843 A1 | 2/2012 | Taylor et al. |
| 2012/0043937 A1 | 2/2012 | Williams |
| 2012/0049991 A1 | 3/2012 | Baarman |
| 2012/0112552 A1 | 5/2012 | Baarman et al. |
| 2012/0119588 A1 | 5/2012 | Baarman et al. |
| 2012/0126745 A1 | 5/2012 | Partovi |
| 2012/0146576 A1 | 6/2012 | Partovi |
| 2012/0150670 A1 | 6/2012 | Taylor et al. |
| 2012/0176085 A1 | 7/2012 | Iida et al. |
| 2012/0235636 A1 | 9/2012 | Partovi |
| 2012/0248095 A1 | 10/2012 | Lee et al. |
| 2012/0259735 A1 | 10/2012 | Taylor et al. |
| 2013/0093259 A1 | 4/2013 | Hente et al. |
| 2013/0249479 A1 | 9/2013 | Partovi |
| 2014/0002225 A1 | 1/2014 | Konanur et al. |
| 2014/0125146 A1 | 5/2014 | Azancot et al. |
| 2014/0203661 A1 | 7/2014 | Dayan et al. |
| 2014/0203988 A1 | 7/2014 | Yang et al. |
| 2014/0239732 A1 | 8/2014 | Mach et al. |
| 2014/0247004 A1 | 9/2014 | Kari et al. |
| 2014/0285008 A1 | 9/2014 | Azancot et al. |
| 2014/0339916 A1 | 11/2014 | Fells et al. |
| 2015/0015180 A1 | 1/2015 | Miller et al. |
| 2016/0056664 A1 | 2/2016 | Partovi |
| 2016/0181857 A1 | 6/2016 | Konanur et al. |
| 2017/0163268 A1 | 6/2017 | Maeda et al. |
| 2018/0140360 A1 | 5/2018 | Andreason |
| 2018/0157300 A1 | 6/2018 | Kamepalli et al. |
| 2018/0233961 A1 | 8/2018 | Hu et al. |
| 2018/0269726 A1 | 9/2018 | Abdolkhani |
| 2019/0097447 A1 | 3/2019 | Partovi |
| 2019/0097448 A1 | 3/2019 | Partovi |
| 2019/0103771 A1 | 4/2019 | Piasecki et al. |
| 2019/0229559 A1 | 7/2019 | Boccoleri et al. |
| 2019/0314564 A1 | 10/2019 | Rudser et al. |
| 2020/0176990 A1 | 6/2020 | Bhat et al. |
| 2020/0244108 A1 | 7/2020 | Kim et al. |
| 2021/0002170 A1 | 1/2021 | Chien et al. |
| 2021/0044132 A1 | 2/2021 | Kristjansson |
| 2021/0083526 A1 | 3/2021 | Bhat et al. |
| 2021/0135468 A1 | 5/2021 | Park et al. |
| 2021/0152020 A1 | 5/2021 | Otsubo et al. |
| 2021/0170082 A1 | 6/2021 | Peichel et al. |
| 2021/0305847 A1 | 9/2021 | Wan et al. |
| 2021/0320745 A1 | 10/2021 | Kim et al. |

FOREIGN PATENT DOCUMENTS

| | | |
|---|---|---|
| JP | 408000838 | 8/1996 |
| JP | 2000068892 A | 3/2000 |
| JP | 2000341885 | 12/2000 |
| JP | 2003045731 A1 | 2/2003 |
| JP | 2006500894 | 1/2006 |
| JP | 2006246633 | 9/2006 |
| JP | 2009200174 | 9/2009 |
| KR | 100836634 | 4/2008 |
| WO | 2003096361 | 11/2003 |
| WO | 2003096512 | 11/2003 |
| WO | 2003105308 | 12/2003 |
| WO | 20030105311 | 12/2003 |
| WO | 2004030176 | 4/2004 |
| WO | 2004038887 | 5/2004 |
| WO | 2004038888 | 5/2004 |
| WO | 2004055654 | 7/2004 |
| WO | 2005024865 | 3/2005 |
| WO | 2005109597 | 11/2005 |
| WO | 2005109598 | 11/2005 |
| WO | 200601557 A1 | 1/2006 |
| WO | 2008137996 | 11/2008 |
| WO | 2011081461 A2 | 7/2011 |
| WO | 20110156768 | 12/2011 |
| WO | 2012040548 A1 | 3/2012 |
| WO | 201200116054 | 8/2012 |
| WO | 2016186520 A1 | 11/2016 |
| WO | 2019022413 A1 | 1/2019 |

OTHER PUBLICATIONS

USPTO; Non-Final Action for U.S. Appl. No. 17/562,268 dated Mar. 30, 2022, 27 pages.

Japanese Patent Office, Office Action for Japanese Patent Application No. 2010-507666, dated Mar. 9, 2015, 8 pages.

Japanese Patent Office, Office Action for Japanese Patent Application No. 2014-104181, dated Mar. 23, 2015, 14 pages.

United States Patent and Trademark Office, Office Action for U.S. Appl. No. 13/830,161, dated Apr. 16, 2015, 24 pages.

Japanese Patent Office, Examiner's Reconsideration Report for Japanese Patent Application No. 2010-507666, dated Jul. 17, 2014, 1 page.

The Patent Office of the People's Republic of China, 2nd Office Action for Chinese Patent Application No. 200880023854.4, dated Apr. 15, 2013, 4 pages.

Unknown Author, System Description Wireless Power Transfer, vol. 1: Low Power Part 1: Interface Definition, Version 1 0, Jul. 2010, 83 pages.

United States Patent and Trademark Office, Office Action for U.S. Appl. No. 13/829,346, dated Feb. 12, 2015, 10 pages.

United States Patent and Trademark Office, Office Action for U.S. Appl. No. 13/829,186, dated Jan. 23, 2015, 12 pages.

United States Patent and Trademark Office, Office Action for U.S. Appl. No. 13/828,933, dated Feb. 5, 2015, 11 pages.

United States Patent and Trademark Office, Office Action for U.S. Appl. No. 13/352,096, dated Aug. 18, 2014, 14 pages.

(56) References Cited

OTHER PUBLICATIONS

United States Patent and Trademark Office, Office Action for U.S. Appl. No. 13/708,584, dated Jan. 23, 2015, 25 pages.
United States Patent and Trademark Office, Office Action for U.S. Appl. No. 12/769,586, dated Jun. 2, 2014, 23 pages.
United States Patent and Trademark Office, Office Action for U.S. Appl. No. 13/708,520, dated Aug. 14, 2014, 9 pages.
United States Patent and Trademark Office, Office Action for U.S. Appl. No. 13/115,811, dated Aug. 20, 2014, 20 pages.
United States Patent and Trademark Office, Office Action for U.S. Appl. No. 14/135,082, dated Dec. 5, 2014, 14 pages.
United States Patent and Trademark Office, Office Action for U.S. Appl. No. 13/708,520, dated Mar. 11, 2015, 10 pages.
International Searching Authority at the U.S. Patent and Trademark Office, International Search Report and Written Opinion for PCT International Patent Application No. PCT/US2013/078534, dated May 13, 2014, 11 pages.
International Searching Authority and Written Opinion From the U.S. Patent and Trademark Office, International Search Report and Written Opinion for PCT International Application No. PCT/US2013/069270, dated Apr. 4, 2014, 9 pages.
Hui, "A New Generation of Universal Contactless Battery Charging Platform for Portable Consumer Electronic Equipment", IEEE Transactions on Power Electronics, vol. 20, No. 3, May 2005, pp. 620-627, 8 pages.
Tang, et al., "Evaluation of the Shielding Effects on Printed-Circuit-Board Transformers Using Ferrite Plates and Copper Sheets", IEEE Transactions on Power Electronics, vol. 17, No. 6, Nov. 2002, pp. 1080-1088, 9 pages.
Liu, et al., "An Analysis of a Double-Layer Electromagnetic Shield for a Universal Contactless Battery Charging Platform", Department of Electronic Engineering City University of Hong Kong, IEEE, 2005, pp. 1767-1772, 6 pages.
Liu, et al., Equivalent Circuit Modeling of a Multilayer Planar Winding Array Structure for Use in a Universal Contactless Battery Charging Platform, IEEE Transactions on Power Electronics, vol. 22, No. 1, Jan. 2007, pp. 21-29, 9 pages.
Liu, et al., "Simulation Study and Experimental Verification of a Universal Contactless Battery Charging Platform with Localized Charging Features", IEEE Transactions on Power Electronics, vol. 22, No. 6, Nov. 2007, pp. 2202-2210, 9 pages.
Liu, et al., "Optimal Design of a Hybrid Winding Structure for Planar Contaclless Battery Charging Platform", IEEE Transactions on Power Electronics, vol. 23, No. 1, Jan. 2008, pp. 455-463, 9 pages.
Karalis, et al., "Efficient Wirelss Non-Radiative Mid-Range Energy Transfer", ScienceDirect, Annals of Physics 323, 2008, pp. 34-48, 15 pages.
Su, et al., "Mutual Inductance Calculation of Movable Planar Coils on Parallel Surfaces", IEEE Transactions on Power Electronics, vol. 24, No. 4, Apr. 2009, pp. 1115-1124, 10 pages.
Hui, et al., "Careless Printed Circuit Board (PCB) Transformers— Fundamental Characteristics and Application Potential", IEEE Circuits and Systems, Vo. 11, No. 3, Third Quarter 2000, pp. 1-48, 48 pages.
Sekitani, et al., "A Large-Area Flexible Wireless Power Transmission Sheet Using Printed Plastic MEMS Switches and Organic Field-Effect Transistors", IEEE, Quantum-Phase Electronics Center, School of Engineering, The University of Tokyo, 2006, 4 pages.
Choi, et al., "A New Contactless Battery Charger for Portable Telecommunication/Compuing Electronics", IEEE, School of Electronic and Electrical Engineering, Kyungpook National University, Taegu, Korea, 2011, pp. 58-59 2 pages.
Hui, et al., "Careless Printed Circuit Board (PCB) Transformers for Power MOSFET/IGBT Gate Drive Circuits", IEEE Transactions on Power Electronics, vol. 14, No. 3, May 1999, pp. 422-430, 9 pages.
Tang, et al., "Careless Planar Printed-Circuit-Board (PCB) Transformers—A Fundamental Concept for Signal and Energy Transfer", IEEE Transactions on Power Electronics, vol. 15, No. 5, Sep. 2000, pp. 931-941, 11 pages.

Hatanaka. et al.. "Power Transmission of a Desk with Cord-Free Power Supply". IEEE Transactions on Magnetics. vol. 38 No. 5, Sep. 2002, pp. 3329-3331, 3 pages.
Fernandez, et al., "Design Issues of a Core-less Transformer for a Contact-less Application", IEEE, Universidad Politecnica de Madrid, 2002, pp. 339-345, 7 pages.
Office Action in connection with Application No. 113/155,811 dated Mar. 8, 2013, 13 pages.
Liu, et al., "Optimal Design of a Hybrid Winding Structure for Planar Contactless Battery Charging Platform", IEEE, Department of Electronic Engineering, City University of Hong Kong, 2006, pp. 2568-2575, 8 pages.
Topfer, et al., "Multi-Pole Magnetization of NdFeB Sintered Magnets and Thick Films for Magnetic Micro-Actuators", ScienceDirect, Sensor and Actuators, 2004, pp. 257-263, 7 pages.
Topfer, et al., "Multi-Pole Magnetization of NdFeB Magnets for Magnetic Micro-Actuators and Its Characterization with a Magnetic Field Mapping Device", ScienceDirect, Journal of Magnetism and Magnetic Materials, 2004, 124-129, 6 pages.
Sakamoto, et al., "A Novel High Power Converter for Non-Contact Charging with Magnetic Coupling", IEEE Transactions on Magnetics, vol. 30, No. 6, Nov. 1994, pp. 4755-4757, 3 pages.
Hui, et al., "Some Electromagnetic Aspects of Careless PCB Transformers", IEEE Transactions on Power Electronics, vol. 15, No. 4, Jul. 2000, pp. 805-810, 6 pages.
Waffenschmidt, et al., "Limitation of Inductive Power Transfer for Consumer Applications", 13th European Conference on Power Electronics and Applications, Barcelona, 2009. EPE '09. pp. 1 -10, 10 pages.
Stokes, "Palm Strikes Back with new OS, Pre Handset at CES, http://arstechnica.com/news.ars/post/20090101-palm-laundhes -new-handset-pre-operating", Jan. 8, 2009, 6 pages.
Sullivan, Visteon to Sell Wireless Gadget Charger, "Wire-Free Technology will Lets Consumers Dump Cords and Chargers", Red Herring, Dec. 29, 2006, 2 pages.
Kim, "Wireless Charger for New Palm Phone", San Francisco Chronicle and SFGate.com, May 11, 2009, 2 pages.
Compeau, Red Zen Marketing, "Could This be the Mojo Behind the Palm Pre's Touchstone Charger?", http://redzenmarketing.posterous.com/could-this-be-the-mojo-behind-the-palm-pres-t, Jun. 5, 2009, 3 pages.
Fulton Innovation LLC, "The Big Story for CES 2007: The Public Debut of eCoupled Intelligent Wireless Power", ecoupled, Dec. 27, 2006, 2 pages.
Miller, "Palm May Make Pre Scarce", The San Jose Mercury News, Apr. 29, 2009, 1 page.
Murakami et al., "Consideration on Cordless Power Station Contactless Power Transmission System", IEEE Transactions on Magnets, vol. 32, No. 5, Sep. 1996, 3 pages.
Epson Air Trans "Wireless Power Transfer", http://www.2k1.co.uk/components/epson_airtrans.asp, Dec. 8, 2008, 2 pages.
Choi, et al., "A New Contactless Battery Charger for Portable Telecommunication/Compuing Electronics", IEEE, School of Electronic and Electrical Engineering, Kyungpook National University, Taegu, Korea, 2001, pp. 58-59 2 pages.
PCT International Preliminary Reporton Patentability dated Nov. 10, 2011 in re International Application No. PCTUS2010/032845, 7 pages.
USPTO; Non-Final Action for U.S. Appl. No. 17/492,083 dated Dec. 8, 2021 79 pages.
USPTO; Non-Final Action for U.S. Appl. No. 17/492,083 dated Dec. 8, 2021, 22 pages.
USPTO; Non-Final Action for U.S. Appl. No. 17/507,351 dated Feb. 2, 2022, 21 pages.
USPTO; Ex parte Quayle Action for U.S. Appl. No. 17/507,351 dated Feb. 24, 2022, 8 pages.
USPTO; Ex parte Quayle Action for U.S. Appl. No. 17/555,303 dated Mar. 7, 2022, 8 pages.
USPTO; Non-Final Action for U.S. Appl. No. 17/522,506 dated Mar. 10, 2022, 8 pages.
USPTO; Ex parte Quayle Action for U.S. Appl. No. 17/555,293 dated Apr. 18, 2022, 7 pages.

(56) References Cited

OTHER PUBLICATIONS

USPTO; Non-Final Action for U.S. Appl. No. 17/492,083 dated Apr. 11, 2022, 29 pages.
USPTO; Notice of Allowance for U.S. Appl. No. 17/677,572 dated May 5, 2022, 10 pages.
USPTO; Non-Final Action for U.S. Appl. No. 17/522,367 dated Jun. 23, 2022, 21 pages.
USPTO; Non-Final Action for U.S. Appl. No. 16/782,214 dated Nov. 5, 2021, 14 pages.
PCT International Search Report in connection with PCT application No. PCT/US2007/61406, 8 pages, dated Feb. 14, 2008.
PCT International Search Report in connection with PCT application No. PCT/US2008/63084, 8 pages, dated Aug. 8, 2008.
Office Action in connection with U.S. Appl. No. 13/442,698 dated Sep. 13, 2012, 6 pages.
Office Action in connection with U.S. Appl. No. 12/116,876 dated May 2, 2011, 5 pages.
Office Action in connection with U.S. Appl. No. 11/669,113 dated May 13, 2010, 20 pages.
Office Action in connection with U.S. Appl. No. 11/669,113 dated Aug. 25, 2009, 17 pages.
Office Action in connection with U.S. Appl. No. 11/669,113 dated Oct. 29, 2008, 11 pages.
Office Action in connection with U.S. Appl. No. 13/113,977 dated Nov. 9, 2012, 9 pages.
International Search Report and Written Opinion of the International Searching Authority, Korean Intellectual Property Office, in re International Application No. PCT/US2010/032845 dated Dec. 13, 2010, 10 pages.
WildCharge Life unplugged!. http://www.wildcharg.com/Apr. 17, 2009, 2 pages.
Powermat "the Future of Wireless Power has Arrived", http://www.pwrmal.com, Apr. 15, 2009, 2 pages.
ECoupled Wireless Power Technology Fulton Innovation, http://www.ecoupled.com, Apr. 15, 2009, 5 pages.
Qualcomm Products and Services—Wirelss Aidink Technologies, http://www.qualcomm.com/products_services/airlinks, Apr. 15, 2009, 4 pages.
Office Action in connection with U.S. Appl. No. 11/757,067 dated Jan. 26, 2009, 14 pages.
Office Action in connection with U.S. Appl. No. 11/757,067 dated Oct. 19, 2009, 14 pages.
Office Action in connection with U.S. Appl. No. 11/757,067 dated May 10, 2010, 15 pages.
WiPower, Wikipedia, the free encyclopedia, http://en.wikipedia.org/wiki/WiPower, Nov. 18, 2011, 2 pages.
PowerbyProxi, Wireless Power Solutions, http://www.powerbyproxi.com/, Nov. 18, 2011, 2 pages.
Now charge your iPhone 4 and 4S with Powermat!, Wireless charging mats and receivers for your iPhone, iPod, Blackberry . . . http://www.powermat.com/, Nov. 18, 2011, 1 page.
Witricity. Wireless Electricity Delivered Over Distance, http://www.witricity.com, Nov. 18, 2011, 1 page.
ConvenientPower, ConvenientPower HK Limited, http://www.convenientpower.com/1/about.php, Nov. 18, 2011, 1 page.
Nigel Power LLC: Private Company Information—Business Week, http://investing.businessweek.com/research/stocks/private/snapshot.asp? p . . . , Nov. 18, 2011, 2 pages.
Sakamoto, et al., "A Novel Circuit for Non-Contact Charging Through Electro-Magnetic Coupling", 1992, IEEE, pp. 165-174.
Abe, et al., "A Non-Contact Charger Using a Resonant Converter with Parallel Capacitor of the Secondary Coil", Apr. 2000, IEEE, Vo.I. 36, No. 2, pp. 444-451.
Sakamoto, et al. "Large Air-Gap Coupler for Inductive Charger", Sep. 1999, IEEE, vol. 35, No. 5, pp. 3526-3528.
Sakamoto, et al. "A Novel Converter for Non-Contact Charging with Electromagnetic Coupling", Nov. 1993, IEEE, vol. 29, No. 6, pp. 3228-3230.
Kim, et al. "Design of a Contaclless Battery Charger for Cellular Phone", Dec. 2001, IEEE, vol. 48, No. 6, pp. 1238-1247.

Hui, et al. "Careless Printed-Circuit Board Transformers for Signal and Energy Transfer", Electronics Letters, May 1998, vol. 34, No. 11, pp. 1052-1054.
Hui, et al. "Optimal Operation of Careless PCB Transformer-Isolated Gate Drive Circuits with Wide Switching Frequency Range", May 1999, IEEE Transactions of Power Electronics, vol. 14, No. 3, pp. 506-514.
Tang, et al. "Characterization of Careless Printed Circuit Board (PCB) Transformers", Nov. 2000, IEEE Transactions of Power Electronics, vol. 15, No. 6, pp. 1275-1282.
Tang, et al. "Careless Printed Circuit Board (PCB) Transformers with Multiple Secondary Windings for Complementary Gate Drive Circuits", May 1999, IEEE Transactions of Power Electronics, vol. 14, No. 3, pp. 431-437.
Tang, et al. "Careless Printed Circuit Board (PCB) Transformers with High Power Density and High Efficiency", May 2000, Electronics Letters, vol. 36, No. 11, pp. 943-944.
Borenstein, "Man Tries Wirelessly Boosting Batteries'", Nov. 2006, USA Today, http://www.usatoday.com/tech/wireless/data/2006-11-16-wireless-recharging_x.htm, 5 pages.
Murph, "WildCharger Charges Your Gadgetry Sans Wires", Dec. 2006, Misc. Gadgets, 2 pages.
Gizmo Watch, "Pitstop: A Table Top Recharging Solution by Belkin", http://www.gizmowatch.com/entry/pitstop-a-table-top-recharging-solution-by-belkin, Dec. 2006, 5 pages.
Unknown Author, "Cutting the Cord", Apr. 2007, The Economist, 1 page.
Bishop, "Microsoft Surface Brings Computing to the Table", May 2007, http://seattlepi.nwsource.com/business/317737 msftdevic30.html, 7 pages.
WildCharge, "The Wire-Free Power Revolution is Only Days Away, and WildCharge, Inc. Is Leading the Charge", Sep. 2007, 3 pages.
Economist.com Science Technology Quarterly, "Wireless Charging", http://www.economist.com/science/tq/PrinterFriendly.cfm?story_id=13174387, Apr. 15, 2009, 4 pages.
United States Patent and Trademark Office, Office Action for U.S. Appl. No. 13/708,548, dated Nov. 20, 2013, 5 pages.
United States Patent and Trademark Office, Office Action for U.S. Appl. No. 13/115,811, dated Sep. 23, 2013, 17 pages.
United States Patent and Trademark Office. Office Action for U.S. Appl. No. 13/708,584, dated Sep. 13, 2013, 16 pages.
United States Patent and Trademark Office, Office Action for U.S. Appl. No. 13/158,134, dated Jan. 22, 2014, 43 pages.
United States Patent and Trademark Office, Office Action for U.S. Appl. No. 13/708,827, dated Feb. 5, 2014, 28 pages.
United States Patent and Trademark Office, Office Action for U.S. Appl. No. 13/708,520, dated Feb. 5, 2014, 8 pages.
United States Patent and Trademark Office, Office Action for U.S. Appl. No. 13/115,811, dated Mar. 4, 2014, 15 pages.
United States Patent and Trademark Office, Office Action for U.S. Appl. No. 13/709,983, dated Feb. 27, 2014, 10 pages.
United States Patent and Trademark Office, Office Action for U.S. Appl. No. 13/710,062, dated Feb. 27, 2014, 9 pages.
United States Patent and Trademark Office, Office Action for U.S. Appl. No. 13/710,017, dated Feb. 27, 2014, 11 pages.
Office Action in connection with U.S. Appl. No. 13/708,520 dated May 24, 2013, 7 pages.
Office Action in connection with U.S. Appl. No. 13/158,134 dated Jun. 12, 2013, 15 pages.
United States Patent and Trademark Office, Office Action for U.S. Appl. No. 13/708,838, dated Mar. 14, 2014, 30 pages.
Office Action in connection with U.S. Appl. No. 13/709,983 dated Jun. 7, 2013, 7 pages.
International Search Report dated Jun. 14, 2013, International Application No. PCT/US2013/033352 filed Mar. 21, 2013, 3 pages.
International Searching Authority, International Search Report and Written Opinion for PCT/US2012/021729, dated Aug. 31, 2012, 9 pages.
Office Action in connection with U.S. Appl. No. 13/710,017 dated Jun. 11, 2013, 7 pages.
European Search Report and Search Opinion in connection with Europe Application 08747863.2 (European National Stage application of PCT/US2008/063084) dated Apr. 2, 2013, 7 pages.

(56) References Cited

OTHER PUBLICATIONS

Office Action in connection with Chinese Application 200880023854.4 (Chinese National Stage application of PCT/US2008/063084) dated Aug. 28, 2012, 18 pages.
Office Action in connection with Japanese Application JP/2010-50766 (Japanese National Stage application of PCT/US2008/063084) dated Dec. 3, 2012, 4 pages.
Office Action in connection with U.S. Appl. No. 13/709,937 dated Sep. 12, 2013, 7 pages.
Office Action in connection with U.S. Appl. No. 12/769,586 dated Dec. 13, 2012, 19 pages.
Office Action in connection with U.S. Appl. No. 13/708,827 dated Jun. 26, 2013, 22 pages.
Office Action in connection with U.S. Appl. No. 13/708,838 dated Jun. 24, 2013, 27 pages.
PCT International Search Report in connection with PCT Application No. PCT/US2011/040062 dated Feb. 17, 2012, 9 pages.
Office Action in connection with U.S. Appl. No. 13/708,548 dated Jun. 7, 2013, 5 pages.
Office Action in connection with U.S. Appl. No. 13/115,811 dated Mar. 28, 2013, 13 pages.
Samsung IPR 2023-01091 Petition for Inter Partes Review of U.S. Pat. No. 11,201,500, dated Jun. 28, 2023; 2,843 pages.
Samsung IPR 2023-01092 Petition for Inter Partes Review of U.S. Pat. No. 11,201,500, dated Jun. 28, 2023; 2,756 pages.
Samsung IPR 2023-01093 Petition for Inter Partes Review of U.S. Pat. No. 11,201,500, dated Jun. 28, 2023; 2,724 pages.
Samsung IPR 2023-01094 Petition for Inter Partes Review of U.S. Pat. No. 11,316,371, dated Jun. 30, 2023; 2,313 pages.
Samsung IPR 2023-01095 Petition for Inter Partes Review of U.S. Pat. No. 11,316,371, dated Jun. 30, 2023; 3,164 pages.
Samsung IPR 2023-01096 Petition for Inter Partes Review of U.S. Pat. No. 11,316,371, dated Jun. 30, 2023; 2,872 pages.
Samsung IPR 2023-01097 Petition for Inter Partes Review of U.S. Pat. No. 11,316,371, dated Jun. 30, 2023; 2,799 pages.
Samsung IPR 2023-01087 Petition for Inter Partes Review of U.S. Pat. No. 9,577,440, dated Jun. 27, 2023; 3,056 pages.
Samsung IPR 2023-01088 Petition for Inter Partes Review of U.S. Pat. No. 9,577,440, dated Jun. 27, 2023; 3,104 pages.
Samsung IPR 2023-01101 Petition for Inter Partes Review of U.S. Pat. No. 11,342,777, dated Jun. 29, 2023; 4,309 pages.
Samsung IPR 2023-01102 Petition for Inter Partes Review of U.S. Pat. No. 11,342,777, dated Jun. 29, 2023; 4,392 pages.
Samsung IPR 2023-01098 Petition for Inter Partes Review of U.S. Pat. No. 11,462,942, dated Jun. 30, 2023; 2,748 pages.
Samsung IPR 2023-01099 Petition for Inter Partes Review of U.S. Pat. No. 11,462,942, dated Jun. 30, 2023; 2,854 pages.
Samsung IPR 2023-01100 Petition for Inter Partes Review of U.S. Pat. No. 11,462,942, dated Jun. 30, 2023; 2,623 pages.
Samsung IPR 2023-01124 Petition for Inter Partes Review of U.S. Pat. No. 11,462,942, dated Jun. 30, 2023; 2,755 pages.
Samsung IPR 2023-01086 Petition for Inter Partes Review of U.S. Pat. No. 7,948,208, dated Jun. 27, 2023; 2,826 pages.
Samsung IPR 2023-01089 Petition for Inter Partes Review of U.S. Pat. No. 11,292,349, dated Jun. 27, 2023; 2,228 pages.
Samsung IPR 2023-01090 Petition for Inter Partes Review of U.S. Pat. No. 11,292,349, dated Jun. 27, 2023; 2,390 pages.

INDUCTIVE CHARGING SYSTEM WITH CHARGING ELECTRONICS PHYSICALLY SEPARATED FROM CHARGING COIL

CROSS REFERENCE TO RELATED APPLICATIONS

This application is a continuation of U.S. patent application Ser. No. 16/782,214, filed Feb. 5, 2020, by Mojo Mobility, Inc., titled "INDUCTIVE CHARGING SYSTEM WITH CHARGING ELECTRONICS PHYSICALLY SEPARATED FROM CHARGING COIL", which claims priority to U.S. Provisional Patent Application No. 62/801,529, filed Feb. 5, 2019, by Afshin Partovi, titled "SYSTEM AND METHOD FOR INFRASTRUCTURE, VEHICLE AND INTERNET OF THINGS," is related to U.S. Pat. No. 8,629,654 to Partovi et al., titled "System and method for inductive charging of portable devices," and is related to U.S. Pat. No. 9,496,732 to Partovi, titled "Systems and methods for wireless power transfer," the disclosures of which are hereby incorporated by reference in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to systems and methods for enabling wireless charging in cases where the wireless charger is installed permanently or semi-permanently in a location and is in general not intended to be moved often. Other embodiments provide additional user benefits.

BACKGROUND

Wireless charging has been implemented for mobile charging applications. Installation of these chargers in offices, restaurants, coffee shops, bars, airports, public places, automobiles, trucks, other vehicles, trains, public transport systems, ships, boats, airplanes, etc. provides some unique challenges. Several embodiments to improve these systems is described. In addition, the wireless chargers can be connected to each other or to the internet to allow remote monitoring of status and enablement of further features for these applications.

Described herein are systems and methods for enabling transfer of power, from one

SUMMARY or more wireless charger or power supplies, to one or more receivers placed on or near the one or more wireless charger or power supplies, including powering or charging one or multiple receivers or devices on each charger or power supply. Some embodiments allow for a charger that can detect foreign objects such as metallic objects and live objects near or on the charger surface. In some embodiments, the charger can support charging mobile devices at higher power levels due to efficient thermal transfer at or near the surface of the charger through use of higher thermal conductivity materials or a combination of materials and charger structure. In other embodiments, the charger comprises a drive electronics and a physically separate coil assembly to allow more flexibility and higher performance from the charger. In yet other embodiments, the charger comprises near field and far field chargers or power supplies combined into one unit or housing and may contain additional features such as NFC or RFID systems, mobile boost antennas and systems, thermal, capacitive or other sensors and means of communication to other systems or networks through the Ethernet, I$^2$C, USB, UART, SPI, CAN, LIN, fiber, Bluetooth, WiFi, Zigbee, 3G, 4G, 5G or proprietary or custom communication.

In some embodiments, the drive electronics may be modular and comprise a main frame and modular units that plug into the frame and allow capability to drive and control connected coil assemblies or additional far field antennas or add WiFi, Bluetooth, NFC or other communication or battery back-up, power supply, storage or other capabilities. In some embodiments, the charger, drive electronics and coil assemblies are incorporated into vehicles, tables, counters or conference rooms in a convenient and low-cost method and provide additional functionalities.

In accordance with various embodiments, described herein are systems and methods of enabling efficient wireless power transfer and charging of devices and batteries or electric vehicles, buses, electric motorcycles, electric bikes, scooters, golf carts, wheel chairs or other carts, airplanes, unmanned aerial vehicles or drones, boats, trains, or any other type of vehicle or transport equipment or robot or any device that can operate with direct application of power or has a rechargeable battery that can power it without being plugged in or connected to a power source or a wirelessly chargeable battery itself. Applications include inductive or magnetic charging and power, far field or radiative power transfer and particularly usage in mobile, electronic, electric, lighting, transport or other devices, autonomous vehicles, batteries, power tools, kitchen, industrial, medical or dental, or military applications, vehicles, robots, drones, trains, boats and other usages. Embodiments can also be applied generally to power supplies and other power sources and chargers, including systems and methods for improved ease of use and compatibility and transfer of wireless power to mobile, electronic, electric, lighting, or other devices, batteries, power tools, kitchen, military, medical, industrial applications and/or vehicles. Such embodiments enable a wireless charger or power supply to be connected to the internet and act as an internet of things device with added functionalities.

In an embodiment, an inductive charger for transmitting power to an inductive receiver of an electronic device for charging the electronic device is disclosed. The inductive charger includes a first enclosure comprising metal and having an electrically non-conductive charging surface on a side of the first enclosure. The first enclosure includes an inductive charging coil positioned behind the charging surface within the first enclosure. The inductive charging coil includes a spiral-shaped metallic Litz wire conductor that defines two charging coil terminals. The inductive charging coil has a first side that faces the charging surface and a second side that faces away from the charging surface opposite the first side. The inductive charging coil is configured to transmit electromagnetic power by inductive power transfer through the charging surface of the enclosure with an alternating magnetic field at an operating frequency when an electronic device is positioned in proximity to the charging surface. The inductive charger further includes a metallic second enclosure physically separated from the first enclosure. The second enclosure includes a drive circuit and a resonant capacitor electrically coupled to the inductive charging coil in the first enclosure to drive the inductive charging coil with an alternating current. The second enclosure further includes a microcontroller electrically coupled to the drive circuit. The microcontroller is configured to detect a received communication of information in a current or voltage modulation of the inductive charger coil by the inductive receiver. The microcontroller is further configured to control the transmission of power during inductive power transfer. The inductive charger further includes a shielded electrical cable that electrically couples the first enclosure and the second enclosure. The shielded electrical cable includes two and only two sets of twisted wires coupling the drive circuit in the second enclosure to the two charging coil terminals of the inductive charging coil in the first enclosure to drive the inductive charging coil and to receive the communication of information from the inductive charging coil. Each set of the two sets of twisted wires includes multiple electrical wires to reduce electrical loss. The shielded electrical cable includes a metallic shield that covers the two sets of twisted wires and is coupled to an electrical ground. The second enclosure is not within the first enclosure.

In an embodiment, an inductive charger for transmitting power to an inductive receiver of an electronic device for charging the electronic device is disclosed. The inductive charger includes a first enclosure comprising metal and having an electrically non-conductive charging surface on a side of the first enclosure. The first enclosure includes an inductive charging coil positioned behind the charging surface within the first enclosure. The inductive charging coil includes a spiral-shaped metallic Litz wire conductor that defines two charging coil terminals. The inductive charging coil has a first side that faces the charging surface and a second side that faces away from the charging surface opposite the first side. The inductive charging coil is configured to transmit electromagnetic power by inductive power transfer through the charging surface of the enclosure with an alternating magnetic field at an operating frequency when an electronic device is positioned in proximity to the charging surface. The inductive charger further includes a metallic second enclosure physically separated from the first enclosure. The second enclosure includes a drive circuit and a resonant capacitor electrically coupled to the inductive charging coil in the first enclosure to drive the inductive charging coil with an alternating current. The second enclosure further includes a microcontroller electrically coupled to the drive circuit. The microcontroller is configured to detect a received communication of information in a current or voltage modulation of the inductive charger coil by the inductive receiver. The microcontroller is further configured to control the transmission of power during inductive power transfer. The inductive charger further includes a shielded electrical cable means that electrically couples the first enclosure and the second enclosure. The shielded electrical cable means includes two and only two sets of twisted wires coupling the drive circuit in the second enclosure to the two charging coil terminals of the inductive charging coil in the first enclosure to drive the inductive charging coil and to receive the communication of information from the inductive charging coil. Each set of the two sets of twisted wires includes multiple electrical wires to reduce electrical loss. The shielded electrical cable means includes a metallic shield that covers the two sets of twisted wires and is coupled to an electrical ground. The second enclosure is not within the first enclosure.

In an embodiment, an inductive charger for transmitting power to an inductive receiver of an electronic device for charging the electronic device is disclosed. The inductive charger includes a first enclosure having an electrically non-conductive charging surface on a side of the first enclosure. The first enclosure includes an inductive charging coil positioned behind the charging surface within the first enclosure. The inductive charging coil includes a spiral-shaped metallic Litz wire conductor that defines two charging coil terminals. The inductive charging coil has a first side that faces the charging surface and a second side that faces away from the charging surface opposite the first side. The inductive charging coil is configured to transmit electromagnetic power by inductive power transfer through the charging surface of the enclosure with an alternating magnetic field at an operating frequency when an electronic device is positioned in proximity to the charging surface. The inductive charger further includes a metallic second enclosure physically separated from the first enclosure. The second enclosure includes a drive circuit and a resonant capacitor electrically coupled to the inductive charging coil in the first enclosure to drive the inductive charging coil with an alternating current. The second enclosure further includes a microcontroller electrically coupled to the drive circuit. The microcontroller is configured to detect a received communication of information in a current or voltage modulation of the inductive charger coil by the inductive receiver. The microcontroller is further configured to control the transmission of power during inductive power transfer. The inductive charger further includes a shielded electrical cable that electrically couples the first enclosure and the second enclosure. The shielded electrical cable includes two and only two sets of twisted wires coupling the drive circuit in the second enclosure to the two charging coil terminals of the inductive charging coil in the first enclosure to drive the inductive charging coil and to receive the communication of information from the inductive charging coil. Each set of the two sets of twisted wires includes multiple electrical wires to reduce electrical loss. The shielded electrical cable includes a metallic shield that covers the two sets of twisted wires and is coupled to an electrical ground. The second enclosure is not within the first enclosure.

In an embodiment, an inductive charger for transmitting power to an inductive receiver of an electronic device for charging the electronic device is disclosed. The inductive charger includes a first enclosure having an electrically non-conductive charging surface on a side of the first enclosure. The first enclosure includes an inductive charging coil positioned behind the charging surface within the first enclosure. The inductive charging coil includes a spiral-shaped metallic Litz wire conductor that defines two charging coil terminals. The inductive charging coil has a first side that faces the charging surface and a second side that faces away from the charging surface opposite the first side. The inductive charging coil is configured to transmit electromagnetic power by inductive power transfer through the charging surface of the enclosure with an alternating magnetic field at an operating frequency when an electronic device is positioned in proximity to the charging surface. The inductive charger further includes a metallic second enclosure physically separated from the first enclosure. The second enclosure includes a drive circuit and a resonant capacitor electrically coupled to the inductive charging coil in the first enclosure to drive the inductive charging coil with an alternating current. The second enclosure further includes a microcontroller electrically coupled to the drive circuit. The microcontroller is configured to detect a received communication of information in a current or voltage modulation of the inductive charger coil by the inductive receiver. The microcontroller is further configured to control the transmission of power during inductive power transfer. The inductive charger further includes a shielded electrical cable means that electrically couples the first enclosure and the second enclosure. The shielded electrical cable means includes two and only two sets of twisted wires coupling the drive circuit in the second enclosure to the two charging coil terminals of the inductive charging coil in the first enclosure to drive the inductive charging coil and to receive the communication of information from the inductive charging coil. Each set of the two sets of twisted wires includes multiple electrical wires to reduce electrical loss. The shielded electrical cable means includes a metallic shield that covers the two sets of twisted wires and is coupled to an electrical ground. The second enclosure is not within the first enclosure.

In an embodiment, an inductive charger for transmitting power to an inductive receiver of an electronic device for charging the electronic device is disclosed. The inductive charger includes a first enclosure comprising metal and having an electrically non-conductive charging surface on a side of the first enclosure. The first enclosure includes an inductive charging coil positioned behind the charging surface within the first enclosure. The inductive charging coil includes a spiral-shaped Printed Circuit Board (PCB) coil with two charging coil terminals. The inductive charging coil has a first side that faces the charging surface and a second side that faces away from the charging surface opposite the first side. The inductive charging coil is configured to transmit electromagnetic power by inductive power transfer through the charging surface of the enclosure with an alternating magnetic field at an operating frequency when an electronic device is positioned in proximity to the charging surface. The inductive charger further includes a metallic second enclosure physically separated from the first enclosure. The second enclosure includes a drive circuit and a resonant capacitor electrically coupled to the inductive charging coil in the first enclosure to drive the inductive charging coil with an alternating current. The second enclosure further includes a microcontroller electrically coupled to the drive circuit. The microcontroller is configured to detect a received communication of information in a current or voltage modulation of the inductive charger coil by the inductive receiver. The microcontroller is further configured to control the transmission of power during inductive power transfer. The inductive charger further includes a shielded electrical cable that electrically couples the first enclosure and the second enclosure. The shielded electrical cable includes two and only two sets of twisted wires coupling the drive circuit in the second enclosure to the two charging coil terminals of the inductive charging coil in the first enclosure to drive the inductive charging coil and to receive the communication of information from the inductive charging coil. Each set of the two sets of twisted wires includes multiple electrical wires to reduce electrical loss. The shielded electrical cable means includes a metallic shield that covers the two sets of twisted wires and is coupled to an electrical ground. The second enclosure is not within the first enclosure.

DETAILED DESCRIPTION

Figure 1:
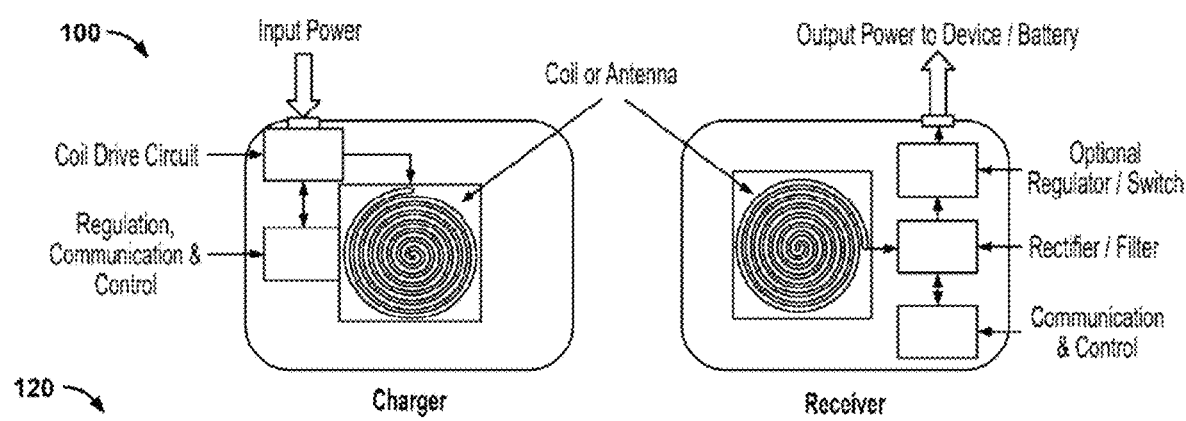
FIG. 1 is a simplified diagram illustrating an exemplary wireless charger or power supply and its components and the charger coil and a wireless power receiver and its components and receiver coil according to some embodiments of the present disclosure.

With the proliferation of electrical and electronic devices and vehicles (which are considered examples of devices herein), simple and universal methods of providing power and or charging of these devices is becoming increasingly important.

In accordance with various embodiments, the term device, product, or battery is used herein to include any electrical, electronic, mobile, phone, watch, headphone or earbud, tablet, laptop, computing device, mouse, headphones, earbuds, hearing aids, virtual reality or augmented reality, head mounted displays or other wearable electronics, lighting, or other product, batteries, power tools, cleaning, industrial, kitchen, lighting, military, medical, surgical, dental or specialized products and vehicles, automobiles, electric bikes, electric motor cycles, electric skate boards and scooters, Segway type of mobility devices, buses, trucks, electric planes or drones or helicopters, shuttles, electric flying cars, autonomous vehicles or movable machines such as robots or other mobile machines or other devices whereby the product, part, or component is powered by electricity or an internal or external battery and/or can be powered or charged externally or internally by a generator or solar cell, fuel cell, hand or other mechanical crank or alike.

In accordance with an embodiment, a product or device can also include an attachable or integral inductive or near field or far field wireless receiver, skin, case, cover, battery door or attachable or add-on or dongle type of receiver component to enable the user to power or charge the product, battery, or device.

Induction is defined as generation of electromotive force (EMF) or voltage across a closed electrical path in response to a changing magnetic flux through any surface bounded by that path.

The amount of inductive coupling that exists between a transmitter (charger) coil with inductance $L_1$ and receiver coil with inductance $L_2$ is expressed as a fractional number (coupling coefficient, k) between 0 and 1 where 0 indicates zero or no inductive coupling, and 1 indicating full or maximum inductive coupling:

$$k = \frac{M}{\sqrt{L_1 L_2}}$$

Where M is the mutual inductance between the two coils. For k=1 the two coils are perfectly coupled and for k=0, there is no coupling or interaction between the two coils. Generally, if k>0.5 the two coils are said to be tightly coupled and if k<0.5 the two coils are said to be loosely coupled.

In literature, typically magnetic induction systems such as used by the Wireless Power Consortium (WPC) or other Standards is defined as tightly coupled cases whereby the charger and receiver coils are of similar sizes or the gap between them is small. Magnetic resonance is a term that has been used recently for inductive power transfer where the charger and receiver may be far apart or the transmitter and receiver coils are of different size. The term loosely coupled wireless charging has also been used for these systems. Since magnetic resonance or loosely coupled wireless charging is in general a form of induction, in the remainder of this document the terms induction or near field wireless power is used for any of these systems (including inductive or tightly coupled wireless power transfer, magnetic resonant or loosely coupled wireless power transfer and hybrid systems) and induction and magnetic resonance are sometimes used interchangeably to indicate that the method of power transfer may be in either domain or a combination thereof. In practice, the tightly coupled systems of WPC and other systems typically operate at k=0.6-0.8 or higher while the loosely coupled systems may operate at k<<0.5 or even k<<0.1.

In accordance with various embodiments, an inductive power transmitter employs a magnetic induction coil(s) transmitting energy to a receiving coil(s) in or on a device or product, case, battery door, or attachable or add-on component including attachments such as through a dongle or a battery inside or outside of device or attached to device through a connector and/or a wire or cables, or stand-alone placed near or on the power transmitter platform. The receiver can be an otherwise incomplete device that receives power wirelessly and is intended for installation or attachment in or on the final product, battery or device to be powered or charged, or the receiver can be a complete device intended for connection to a device, product or battery directly by a wire or wirelessly. As used herein, the term wireless power, near field power transfer or charging, charger, transmitter or inductive or magnetic resonance power and charger are used interchangeably.

It is also possible to transfer power wirelessly using Far-field electromagnetic emission whereby using much higher frequencies (hundreds of MHz, GHz or higher), Electromagnetic fields of wavelength of several cm or shorter are generated at a transmitter antenna and at distances of several cm from the transmitter, the power is radiative with the resulting electric and magnetic fields related to each other by Maxwell's equations. These generated radiative fields such as radio or WiFi or cellular tower signals can propagate for a long distance and are mainly used for transmission of communication. However, recently, several systems for radiative transmission of power have been commercialized. In these systems the power is transmitted at 100s of MHz to GHz from an antenna and propagates to one or more receiver antennas embedded in mobile devices, lights or sensors (see PowerCast Corporation, Energous Corporation, Ossia Inc., etc.). Since the wavelength of these fields is several cm or shorter, they can be generated and emitted from small size antennas with comparable size to the antennas quite efficiently and are well suited for small transmitters and receivers that can be incorporated into common mobile, laptop and other mobile applications. The advantage of these systems is that such systems can provide power to receivers or devices at large distances of several cm to meters and the power distribution can be quite broad in area and alleviate the need for accurate receiver positioning or alignment. However, the power received at a receiver drops quadratically away from the transmitter. As an example, using a 1 Watt transmitter, tens of mW may be available at several cm away. However, for low power mobile (electronic or smart watches or monitors, electronic or virtual reality glasses or displays, displays, earbuds, headphones, hearing aids, electronic mouse or pens, and sensor applications with batteries or power needs of several mW, this may be adequate. Increasing the received power by increasing the transmitter power may not be practical due to emission limits set by regulatory (such as FCC or CE) guidelines. Thus, it may not be practical to use a 50 or 100 W transmitter to be able to transfer Watts of power to a receiver in a mobile phone or tablet or laptop to charge those kinds of devices. Unlike Near field power transfer, the presence of one or more receivers does not affect the transmitter operation since the transmitter and receivers are completely uncoupled (unless they are brought very close together).

In accordance with an embodiment, the wireless charger can be a flat or curved surface or open or enclosed volume or part that can provide energy wirelessly to a receiver. It can also be constructed of flexible materials and/or coils and housing or even plastic electronics to enable mechanical flexibility and bending or folding to save space or for conformity to non-flat surfaces. The wireless charger can also comprise coils and magnetic materials and sensors and other antenna and/or circuitry built on flexible substrates or flexible itself and may be housed or embedded in Thermoplastic, Polyurethane, ABS or other plastic material or rubber or other flexible material to provide a rugged or water/liquid impervious coil or charger assembly.

In accordance with an embodiment, the wireless charger may be directly powered by an AC power input, DC power, or other power source such as a car, motorcycle, truck or other vehicle or airplane or boat or ship or train power outlet, or vehicle, boat, ship, train motorcycle, truck or airplane itself, primary (non-rechargeable) or rechargeable battery, solar cell, fuel cell, mechanical (hand crank, wind, water source, etc.), nuclear source or other or another wireless charger or power supply or a combination thereof. In addition, the wireless charger may be powered by a part such as a rechargeable battery which is itself in turn recharged by another source such as an AC or DC power source, vehicle, boat or ship or airplane outlet or vehicle, boat or ship or airplane itself, solar cell, fuel cell, or mechanical (hand crank, wind, water, etc.) or nuclear source, etc. or a combination thereof.

In accordance with various embodiments, in cases where the wireless charger is powered by a rechargeable source such as a battery, the battery can also be itself in turn inductively charged by another wireless charger. The wireless charger can be a stand-alone part, device, or product, or may be incorporated into another electric or electronics device, table, desk chair, armrest, TV stand or mount or furniture or vehicle or airplane or marine vehicle or boat or objects such as a table, desk, chair, counter-top, shelving or check out or cashier counters, kiosk, car seat, armrest, car console, car door, netting, cup holder, dashboard, glovebox, etc., airplane tray, computer, laptop, netbook, tablet, notebook, phone, display, TV, smart speaker, smart video devices, smart internet connected speakers similar to Amazon Echo, Google Home or Apple HomePod, magnetic, optical or semiconductor storage or playback device such as hard drive, solid state storage drive, optical players, etc., cable or game console, computer pads, toys, clothing, bags, case or backpack, belt or holster, etc., industrial, medical, dental, military equipment or kitchen counter, area, devices and appliances, phones, cameras, radios, stereo systems, speakers, etc. The wireless charger may also have other functions built-in or be constructed such that it is modular and additional capabilities/functions can be added as needed. In addition, the wireless charger may incorporate means for wired charging such as USB or lightning or other outlets to allow charging or powering of devices through a wired method to be able to charge or power devices that don't have wireless charging receivers.

In accordance with various embodiments, some of these capabilities/functions include an ability to provide higher power, charge more devices, exchange the top surface or exterior box or cosmetics, operate by internal power as described above through use of a battery and/or renewable source such as solar cells, communicate and/or store data from a device, provide communication between the device and other devices or the charger and/or a network, etc. An example is a basic wireless charger that has the ability to be extended to include a rechargeable battery pack to enable operation without external power. Examples of products or devices powered or charged by the induction transmitter and receiver include but are not limited to batteries, cell phones, smart phones, cordless phones, communication devices, heads-up displays, wearable computer with head mounted display, 3-d TV glasses, wearable electronic glasses, wearable computer or communication devices, virtual or augmented reality displays, head ware or helmets, communication or display watches, pagers, personal data assistants, portable media players, global positioning (GPS) devices, powered headphones or noise cancelling headphones, earbuds or hearing aids, cases for electronics devices that contain batteries and in turn charge one or more devices such as hearing aid, earbud or AirPod® cases, Bluetooth headsets and other devices, shavers, watches, tooth brushes, calculators, cameras, optical scopes, infrared viewers, computers, laptops, tablets, netbooks, keyboards, computer mice, book readers or email devices, pagers, computer monitors, televisions, music or movie players and recorders, storage devices, radios, clocks, speakers, smart internet connected speakers similar to Amazon Echo®, Google Home® or Apple HomePod®, gaming devices, game controllers, toys, remote controllers, power tools, cash register, delivery or other type of scanners, construction tools, office equipment, robots including vacuum cleaning robots, floor washing robots, pool cleaning robots, gutter cleaning robots or robots used in hospital, clean room, military or industrial environments, industrial tools, mobile vacuum cleaners, medical or dental tools, medical stretcher batteries, mobile medical stations or computer stands, military equipment or tools, kitchen appliances, mixers, cookers, can openers, food or beverage heaters or coolers such as electrically powered beverage mugs, massagers, adult toys, lights or light fixtures, signs or displays, or advertising applications, electronic magazines or newspapers or magazines or newspapers containing an electronic and/or display part, printers, fax machines, scanners, electric vehicles, electric golf carts, buses, trucks, trains, planes, drones, autonomous vehicles, flying machines, motorcycles or bicycles, Segway type of devices, trains or other vehicles or mobile transportation machines, and other battery or electrically powered devices or products or a product that is a combination of the products listed above.

In accordance with an embodiment, the receiver and/or the charger can be incorporated into a bag, backpack, hand bag, briefcase, carrier, skin, cover, clothing, case, packaging, product packaging or box, crate, box, display case or rack, table, counter, chair, surface, bottle or device etc. to enable some function inside the bag, carrier, skin, clothing, case, packaging, product packaging or box, crate, box, display case or rack, table, bottle (such as, e.g., causing a display case or packaging to display promotional information or instructions, or to illuminate) and/or to use the bag, carrier, skin, clothing, case, packaging, product packaging or box, crate, box, stand or connector, display case or rack, table, bottle, etc., to power or charge another device or component somewhere on or nearby.

In accordance with various embodiments, the product or device does not necessarily have to be portable and/or contain a battery to take advantage of induction or wireless power transfer. For example, a lighting fixture, speaker, clock or a computer monitor that is typically powered by an AC outlet or a DC power supply may be placed on a table top and receive power wirelessly. The wireless receiver may be a flat or curved surface or part that can receive energy wirelessly from a charger. The receiver and/or the charger can also be constructed of flexible materials for the housing and/or coils or even plastic electronics to enable mechanical flexibility and bending or folding to save space or for conformity to non-flat surfaces.

In accordance with various embodiments, many of these devices contain internal batteries, and the device may or may not be operating during receipt of power. Depending on the degree of charge status of the battery or its presence and the system design, the applied power may provide power to the device, charge its battery or a combination of the above. The terms charging and/or power are used interchangeably herein to indicate that the received power can be used for either of these cases or a combination thereof. In accordance with various embodiments, unless specifically described, these terms are therefore used interchangeably. Also, unless specifically described herein, in accordance with various embodiments, the terms charger, power supply, and transmitter are used interchangeably.

In accordance with an embodiment, a typical operation of a wireless power system can be as follows: the charger periodically activates the charger coil driver and powers the charger coil with a drive signal of appropriate frequency. During this 'ping' process, if a receiver coil is placed on or close to the charger coil, power is received through the receiver coil and the receiver circuit is energized. The receiver microcontroller is activated by the received power and begins to perform an initiation process whereby the receiver ID, its presence, power or voltage requirements, receiver or battery temperature or state of charge, manufacturer or serial number and/or other information is sent back to the charger. If this information is verified and found to be valid, then the charger proceeds to provide continuous power to the receiver. The receiver can alternately send an end of charge, over-temperature, battery full, or other messages that will be handled appropriately by the charger and actions performed. The length of the ping process should be configured to be of sufficient length for the receiver to power up its microcontroller and to respond back and for the response to be received and understood and acted upon. The length of time between the pings can be determined by the implementation designer. If the ping process is performed often, the stand-by power use of the charger is higher. Alternately, if the ping is performed infrequently, the system will have a delay before the charger discovers a receiver nearby; As a result, in practice, a balance should be strived for.

Alternatively, the ping operation can be initiated upon discovery of a nearby receiver by other means. This provides a very low stand-by power use by the charger and may be performed by including a magnet in the receiver and a magnet sensor in the charger or through optical, capacitive, measurement of change of the quality factor (Q) of the charger coil, weight, NFC or Bluetooth, RFID or other RF communication or other methods for detection.

Figure 2:
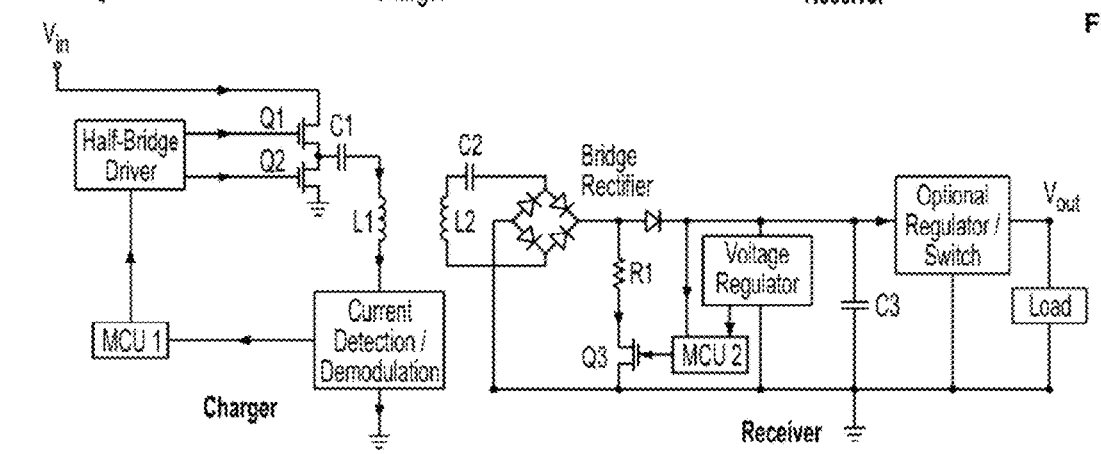
FIG. 2 is a simplified diagram illustrating exemplary circuit components of a wireless charger or power supply and its components and a circuit for a wireless power receiver and its components according to some embodiments of the present disclosure.

Multiple methods exist to measure the Quality factor of a charger coil. In one method, the generated voltage across the charger coil L1 as a result of an applied voltage to the charger resonant circuit comprising L1 and C1 by the charger driver switches in FIG. 2 is measured as a function of frequency. The inductance value of the resonance capacitor C1 is chosen such that the resonance frequency of the system is in a suitable range. The Quality factor of the charger coil is calculated as the ratio of the RMS voltage across the coil and the RMS voltage that is driving the system at the resonance frequency. In another technique, a small number of drive pulse cycles at a frequency near the circuit resonance are applied to the charger LC circuit by the drive circuit and the rate of reduction of the voltage across the L1 coil is measured as a function of time. By measuring this rate of decay of this resonance signal (Rate), the Quality factor, Q of the circuit can be found: $Q=\pi/(-\ln(\text{Rate}))$.

In an embodiment, presence of any foreign objects such as metallic objects or a receiver can affect the Quality factor and can be detected by above methods. During stand-by of charger, the Quality factor can be measured by the charger as described above. Once a Q factor change is detected, the charger may search for any possible receiver communication to indicate presence of a receiver. In case this communication is not received by a charger, the charger may determine presence of a foreign object and may not proceed to any charging or further pinging operation until the foreign object is removed or it may take other actions such as to notify the user, etc. The above procedure provides a mechanism for foreign object detection (FOD) before start of charging. But foreign objects may be introduced during charging. For example, coins, keys or other metal objects may be placed on a charger surface after a mobile device is placed on it. It is possible to use Q factor or capacitive techniques to detect such a change as well. Since the drive electronics is applying voltage near resonance to the charger coil during charging, it is possible to detect a sudden change to the voltage across the charger coil and detect a Q factor change. However, such a small change may be difficult to detect. In an embodiment, a FOD monitor circuit comprising a second coil of similar or different design to the charger coil may be incorporated into the coil assembly and driven by a separate drive electronics and resonant capacitor at a different resonant frequency and at a low power level. Measurement of the voltage across this monitor coil as described above can provide a method for FOD before and during charging process. Since different metals and shapes or thicknesses of metals have different electromagnetic absorption peaks, by selecting the monitor circuit frequency appropriately, metal objects of desired size, shape and metal composition may be detected. In an embodiment, the same charger coil as used for power transfer may be used for the monitor circuit. In this case, in addition to the charging resonant capacitor and drive electronics, a set of a separate monitor resonant capacitor and drive electronics is attached to the charger coil terminals and the coil is driven simultaneously by two distinct signals at different frequencies. The monitor circuit rail or applied voltage may also be at a different, lower voltage than the charger voltage or the monitor circuit operated at farther frequency from its resonance to lower power usage from the monitor circuit.

In another implementation, capacitive techniques may be used to determine FOD or live object detection (LOD) in cases where presence of a live object during charging at high powers such as for electric vehicle (EV) or robotic charging is a concern. The same charging coil or a monitor coil or other continuous or non-continuous layers and the same charger drive circuit or a separate drive circuit and associated inductors, capacitors or circuits incorporated in a charger coil assembly or the drive electronics connected to the coil assembly may be used to measure the change in capacitance of an environment over the charger coil and actions as described above may be taken to pause, stop or prevent charging in case of any detection. The implementations above are not to be exhaustive and a combination of the above techniques may be used to improve accuracy of the detection or achieve desired results as needed.

Alternatively, the system can be designed or implemented to be always ON (i.e. the charger coil is powered at an appropriate drive frequency) and presence of the receiver coil brings the coil to resonance with the receiver coil and power transfer occurs. The receiver in this case may not even contain a microcontroller and act autonomously and may simply have a regulator in the receiver to provide regulated output power to a device, its skin, case, or battery. In those embodiments in which periodic pinging is performed, the presence of a receiver can be detected by measuring a higher degree of current flow or power transfer or communication between the charger and receiver or other means and the charger can simply be kept on to continue transfer of power until either the power drawn falls below a certain level or an end of charge and/or no device present is detected.

In another embodiment, the charger may be in an OFF or standby, or low or no power condition, until a receiver is detected by means of its presence through a magnetic, RF, optical, capacitive or other methods. For example, in accordance with an embodiment the receiver can contain an RFID chip and once it is present on or nearby the charger, the charger would turn on or begin pinging to detect a receiver.

In accordance with an embodiment, the communication between the receiver and charger needs to follow a pre-determined protocol, baud rate, modulation depth, etc. and a pre-determined method for hand-shake, establishment of communication, and signaling, etc. as well as optionally methods for providing closed loop control and regulation of power, voltage, etc. in the receiver.

In accordance with an embodiment, in response to the receiver providing information regarding output power or voltage, etc. the charger can modify voltage, frequency or duty cycle of the charger coil signal or a combination of the above. The charger can also use other techniques to modify the power out of the charger coil and to adjust the received power. Alternatively, the charger can simply continue to provide power to the receiver if an approved receiver is detected and continues to be present. The charger may also monitor the current into the charger coil and/or its temperature to ensure that no extra-ordinary fault conditions exist. One example of this type of fault may be if instead of a receiver, a metal object is placed on the charger.

In accordance with an embodiment, the charger can adjust one or more parameters to increase or decrease the power or voltage in the receiver, and then wait for the receiver to provide further information before changing a parameter again, or it can use more sophisticated Proportional Integral Derivative (PID) or other control mechanism for closing the loop with the receiver and achieving output power control. Alternatively, as described above, the charger can provide a constant output power, and the receiver can regulate the power through a regulator or a charger IC or a combination of these to provide the required power to a device or battery.

As shown in FIG. 1, in accordance with an embodiment, a wireless charger or power system 100 comprises a first charger or transmitter part, and a receiver connected to a mobile or stationary device, vehicle or battery or its charging or power circuit to provide electric power to power or charge the mobile or stationary device, vehicle or its battery.

FIG. 1 shows an embodiment where one charger or power transmitter is charging or powering one receiver. However, in a more general case, the transmitter may comprise one or more transmitters or chargers operating at different power levels and/or using different protocols to power one or more receivers operating at different power levels, voltages and/or protocols.

FIG. 2 illustrates a more detailed view of a wireless charger system, in accordance with an embodiment, with a DC/AC converter comprising a half-bridge inverter geometry, wherein a pair of transistors Q1 and Q2 (such as FETs, MOSFETs, or other types of switch) are driven by a half-bridge transistor driver IC and the voltage is applied to the coil L1 through one or more capacitors shown as C1 in parallel or in series with the Coil L1. In accordance with another embodiment, 4 switches in a full-bridge inverter or other topology may also be used. In accordance with an embodiment, the receiver includes a coil and an optional capacitor (for added efficiency) shown as C2 that may be in series or in parallel with the receiver coil L2. The charger and/or receiver coils can also include impedance matching circuits and/or appropriate magnetic material layers behind (on the side opposite to the coil surfaces facing each other)

them to increase their inductance and/or to shield the magnetic field leakage to surrounding area. The charger and/or receiver can also include impedance matching circuits to optimize/improve power transfer between the charger and receiver.

In several of the embodiments and figures described herein, the resonant capacitor C2 in the receiver is shown in a series embodiment. This is intended only as a representative illustration, and this capacitor can be used in series or parallel with the receiver coil. Similarly, the charger is generally shown in an embodiment where the resonant capacitor is in series with the coil. System implementations with the capacitor C1 in parallel with the charger coil or more complex circuits including capacitors and inductors are also possible.

In accordance with an embodiment, the charger can also include a circuit that measures the current through and/or voltage across the charger coil (in FIG. 2, a current sensor is shown as an example). Communication between the receiver and the charger can also be provided through the same coils as used for the power transfer, through modulation of a load in the receiver or modulation of the amplitude or frequency of the charger coil signal. Various demodulation methods for detection of the communication signal on the charger current or voltage are available. This demodulation mechanism can be, e.g., an AM or FM receiver (depending on whether amplitude or frequency modulation is employed in the receiver or charger modulator), similar to a radio receiver tuned to the frequency of the communication or a heterodyne detector. The detection circuitry can include one or more fixed, programmable or adjustable filters to help demodulate the communication messages.

In accordance with an embodiment the communication and control between the charger and the receiver(s) is conducted over a separate or additional RF or optical or other channels. Optional methods of communication between the charger and receiver can be provided through the same coils as used for transfer of power, through a separate coil, through an RF or optical link, through, e.g., RFID, Bluetooth, WiFi, Wireless USB, NFC, Felica, Zigbee, or Wireless Gigabit (WiGig) or through such protocols as defined by the Wireless Power Consortium (WPC), Air Fuel Alliance or other protocols or standards, developed for wireless power, or specialized protocols such as Dedicated Short Range Communications (DSRC) or WiFi or other wireless method for automotive and Electric Vehicle (EV) charging applications, or other communication protocol, or combinations thereof. This communication may also be encrypted for additional security. In accordance with above embodiments, the charger or power supply may be considered an internet of things (IOT) device that can be monitored or controlled remotely.

In accordance with an embodiment, the microcontroller unit (MCU) in the charger (MCU1) is responsible for decoding the communication signal from a detection/demodulation circuit and, depending on the algorithm used, making appropriate adjustments to the charger coil drive circuitry to achieve the desired output voltage, current or power from the receiver output.

Figure 3:
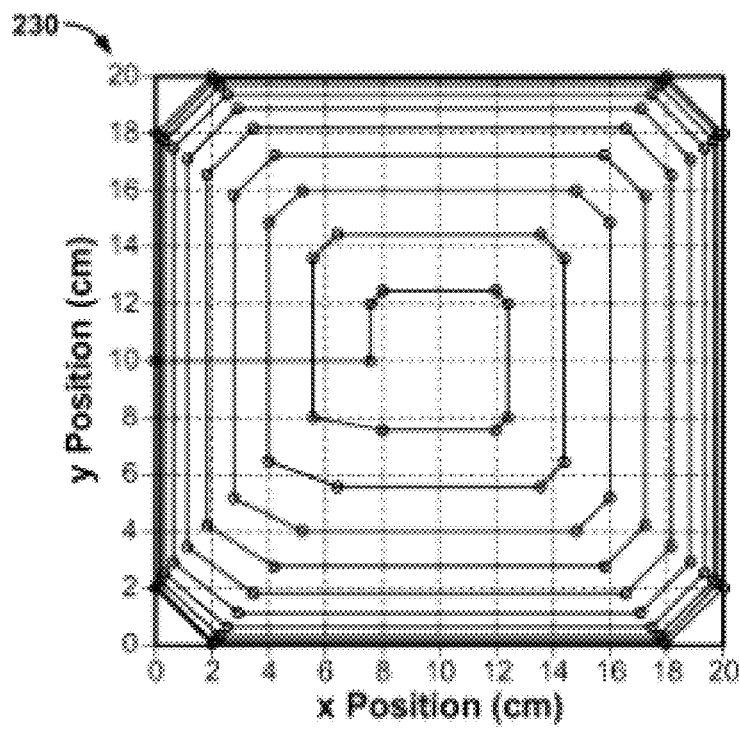
FIG. 3 is a simplified diagram illustrating an exemplary wireless charger or power supply coil pattern to produce a uniform magnetic field according to some embodiments of the present disclosure.
Figure 4:
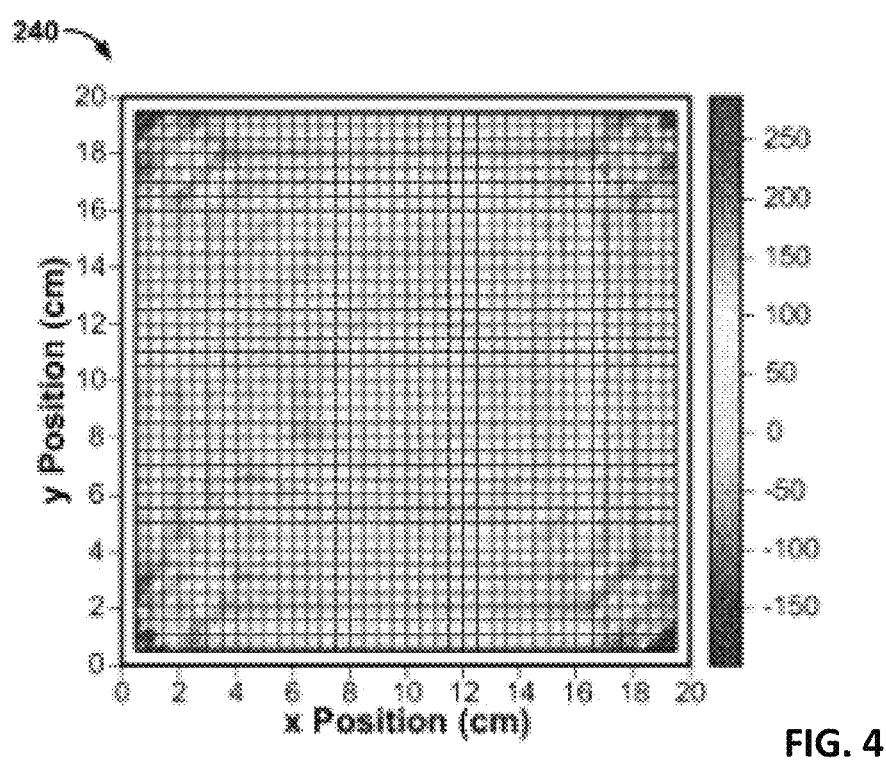
FIG. 4 is a simplified diagram illustrating the calculated magnetic field from the wireless charger or power supply coil pattern of FIG. 3 according to some embodiments of the present disclosure.

As described earlier, it may be preferable for one or more receivers to receive power when placed at a variety of locations or anywhere on or near a wireless charger area. Such an implementation, in general would benefit from a charger and/or receiver design that allows a uniform power transfer over an area or the entire surface of the charger. To provide more uniform power transfer across a coil, in accordance with an embodiment, methods to provide a more uniform magnetic field across a coil can be used. For example, one method for achieving this uses a hybrid coil comprising a combination of a wire and PCB coils (e.g., X. Liu and S. Y. R. Hui, "Optimal design of a hybrid winding structure for planar contactless battery charging platform," IEEE Transactions on Power Electronics, vol. 23, no. 1, pp. 455-463, 2008). In another method, the transmitter coil can be constructed of Litz wire or patterned Printed Circuit Board (PCB) and has a pattern that is very wide between successive turns at the center and is more tightly wound as one gets closer to the edges (e.g., J. J. Casanova, Z. N. Low, J. Lin, and R. Tseng, "Transmitting coil achieving uniform magnetic field distribution for planar wireless power transfer system," in Proceedings of the IEEE Radio and Wireless Symposium, pp. 530-533, January 2009). FIG. 3 shows an example of a coil in accordance with an embodiment that has a coil winding pattern to produce a uniform magnetic field near the coil. FIG. 4 shows the resulting magnetic field from such a coil.

In a geometry described in U.S. Patent Publication No. 20080067874, a planar spiral inductor coil is demonstrated, wherein the width of the inductor's trace becomes wider as the trace spirals toward the center of the coil to achieve a more uniform magnetic field allowing more positioning flexibility for a receiver across a transmitter surface.

In yet other embodiments (F. Sato, et al., IEEE Digest of Intermag 1999, PP. GR09, 1999), the coil can be a meandering type of coil wherein the wire is stretched along X or Y direction and then folds back and makes a back and forth pattern to cover the surface.

In accordance with an embodiment, the charger can operate continuously, and any appropriate receiver coil placed on or near its surface will bring it to resonance and will begin receiving power. The regulation of power to the output can be performed through a regulation stage and/or tuning of the resonant circuit at the receiver. Advantages of such a system include that multiple receivers with different power needs can be simultaneously powered in this way. The receivers can also have different output voltage characteristics.

Figure 5:
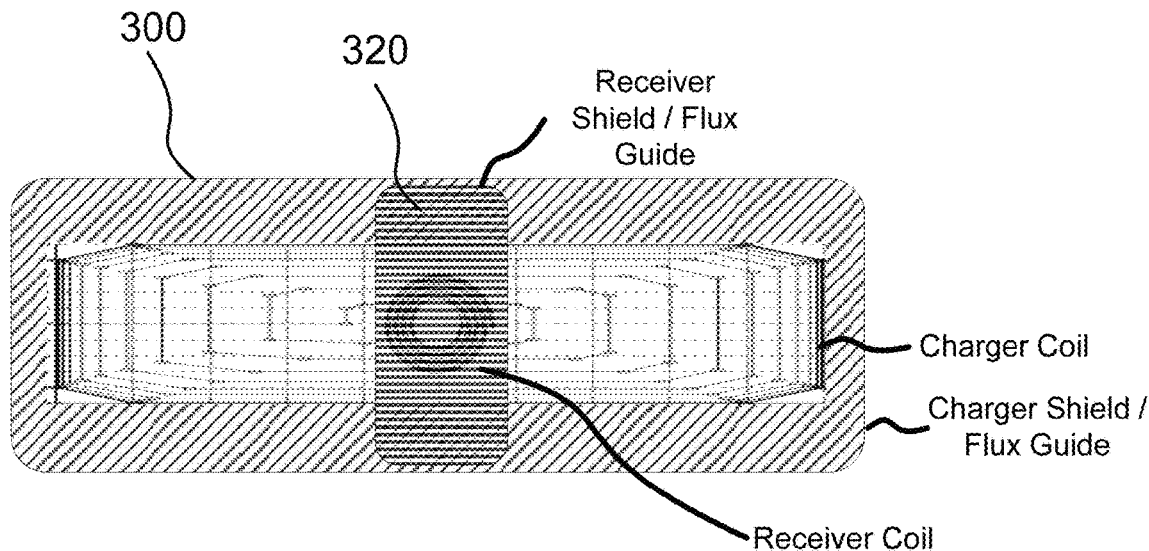
FIG. 5 is a simplified diagram illustrating an exemplary coil assembly for a wireless power charger or power supply and the coil assembly for a receiver where the charger coil assembly is larger in one or more dimensions than the receiver coil assembly according to some embodiments of the present disclosure.
Figure 6:
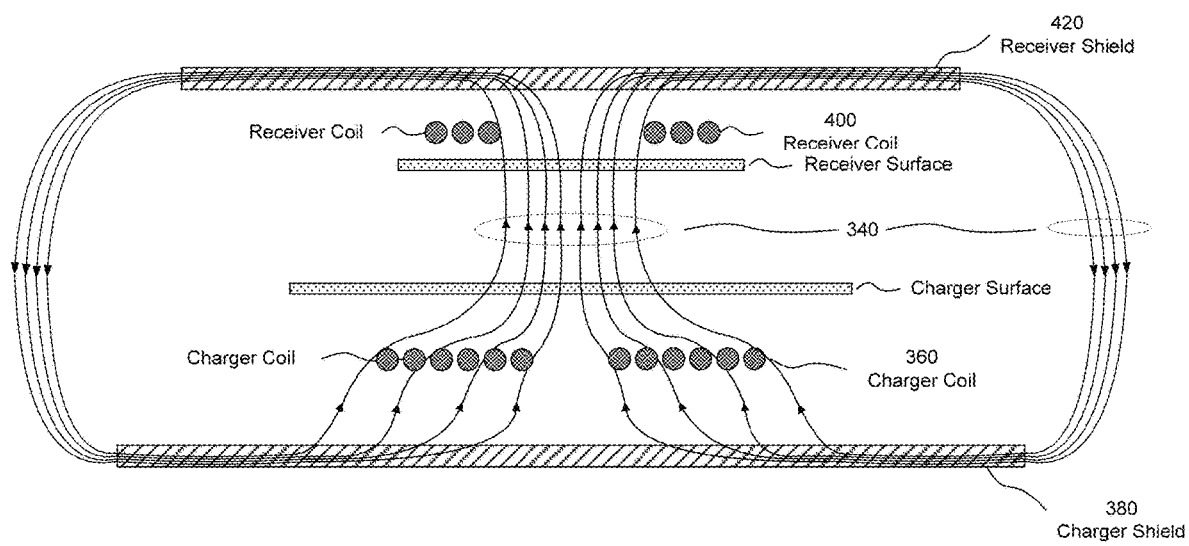
FIG. 6 is a simplified diagram illustrating an exemplary side view of the magnetic flux pattern for the charger or power supply and the receiver of FIG. 7 according to some embodiments of the present disclosure.

As described in U.S. Pat. No. 9,178,369B2, which application is herein incorporated by reference, in accordance with an embodiment shown in FIG. 5, a charger coil is placed on a magnetic flux guide/shielding layer that extends beyond the edges of the coil to form a coil assembly 300. The receiver coil assembly 320 similarly has a magnetic flux/shielding layer that extends beyond the size of the coil allowing an overlap area between these flux layers on the top and bottom sides of the receiver. FIG. 6 shows the magnetic flux 340 generated by the charger coil 360 that passes the receiver coil and is guided efficiently by the magnetic shield/flux guide layer of the receiver 420 back to the magnetic shield/flux guide layer of the charger 380 to close on itself. Such an efficient Flux Guide (FG) geometry results in confinement of power transfer to the area of overlap of a receiver and charger coil and significant increase in power transfer efficiency and reduction of undesirable electromagnetic emission compared to Magnetic Resonance (MR) systems. It is also possible to further decrease any potential emissions from non-covered areas of the charger coil assembly (coil and the magnetic shield/flux guide layer) by covering the charger coil with a saturable magnetic shield layer to reduce emissions and/or use of a permanent or electromagnet in the receiver to selectively saturate the saturable magnetic layer to locally allow magnetic flux transmission from the charger to the receiver.

In accordance with an embodiment, an ideal system with largely mis-matched (i.e. dissimilar in size/shape) Flux Guide (FG), Magnetic Resonant (MR) or other geometry charger and receiver coils can potentially have several advantages, for example: Power can be transferred to the receiver coils placed anywhere on the transmitter coil. Several receivers can be placed and powered on one transmitter allowing for simpler and lower cost of transmitter. Systems with higher resonance Q can be designed so the gap between the transmitter and receiver coil can be larger than a tightly coupled system leading to design of systems with more design freedom. In practice, power transfer in distances of several cm or even higher have been demonstrated. Power can be transferred to multiple receivers simultaneously. In addition, the receivers can potentially be of differing power rating or be in different stages of charging or require different power levels and/or voltages.

In accordance with an embodiment, in order to achieve the above characteristics and to achieve high power transfer efficiency, the lower k value is compensated by using a higher Q through design of lower resistance coils, etc. The power transfer characteristics of these systems may differ from tightly coupled systems and other power drive geometries that use half-bridge, full bridge inverters or resonant converters. Class D or E inverter designs or Zero Voltage Switching (ZVS) or Zero Current Switching (ZCS) or other power transfer systems may potentially operate more efficiently in these situations. In addition, impedance matching circuits at the charger/transmitter and/or receiver may be required to enable these systems to provide power over a range of load values and output current conditions. General operation of the systems can, however, be quite similar to the tightly coupled systems and one or more capacitors in series or parallel with the transmitter and/or receiver coils is used to create a tuned circuit that may have a resonance for power transfer. Operating near this resonance point, efficient power transfer across from the transmitter to the receiver coil can be achieved. Depending on the size difference between the coils and operating points, efficiencies of over 50% up to near 80% have been reported in such loosely coupled systems.

Figure 7:
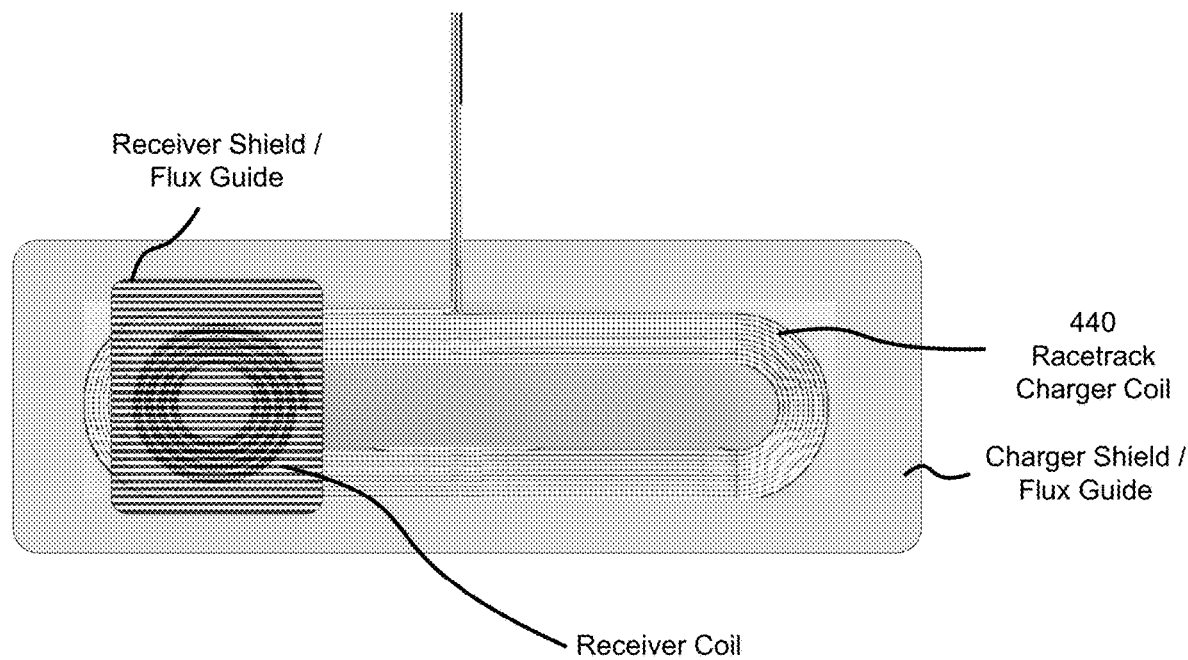
FIG. 7 is a simplified diagram illustrating an exemplary racetrack pattern charger or power supply coil assembly and a corresponding receiver coil assembly according to some embodiments of the present disclosure.

While the coil structure of FIG. 3 provides a uniform magnetic field, to achieve high power transfer efficiency (ratio of output power from the receiver from input DC power to the Transmitter or charger) using this type of coil geometry typically requires a receiver coil that has a similarly spaced coil structure. Many typical coils used in wireless charging receivers are simple spiral patterns with the adjacent wire windings spaced uniformly apart. Optimizing coupling between the transmitter/charger coil and the receiver coils to provide maximum power transfer and/or efficiency is desirable in many circumstances. An alternative coil structure that has been found to provide high power transfer efficiency and position freedom is shown in FIG. 7. Such a coil 440 essentially comprises a race track pattern with the width of the racetrack and number of turns optimized for typical receiver coils to provide optimized efficiency and power transfer. In an embodiment, for typical receiver coils (for example 25-40 mm diameter or on a side (for square shaped receiver coils) common on mobile device and mobile phone receivers, a transmitter racetrack coil of 44 mm external width (along Y axis as shown in FIG. 7) has been determined to be optimum. Racetrack coils of sizes with the length (the longer side) of upto ~53 mm have been built before to accommodate somewhat larger position freedom while charging one mobile device at a time (see "*The Qi Wireless Power Transfer* System; Power Class 0 Specification; Part 4: Reference Designs; Version 1.2.3").

Figure 8:
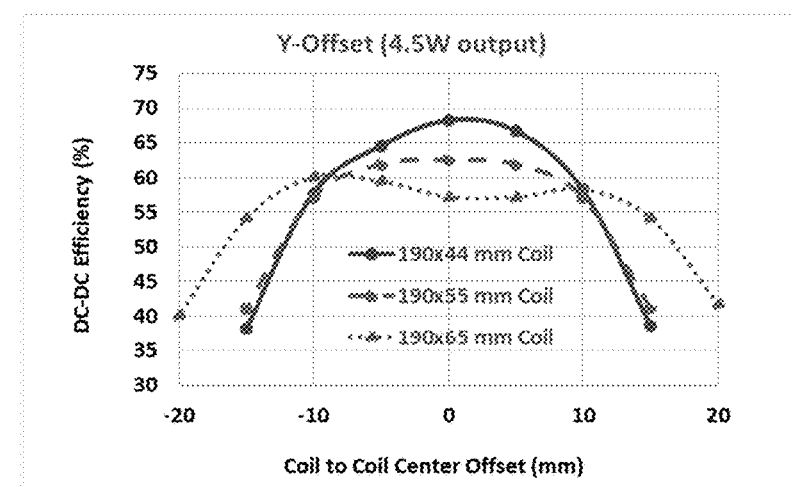
FIG. 8 is a simplified diagram illustrating the efficiency of several different race track style coil assemblies with different outer dimensions as a function of receiver center coil placement with respect to charger or power supply coil center according to some embodiments of the present disclosure.

However, it is generally believed that larger lengths reduce the coupling coefficient and with conventional tightly coupled receivers such as WPC receivers, do not yield good efficiency or power transfer and also reduce the feedback communication signal quality from the receiver and therefore have not been implemented. In an embodiment of this invention, the length of the racetrack (along X axis as shown in FIG. 7) has been designed to be 1.5, 2, 3, 4 and even 6 times the width of the coil. Such coils produce coupling coefficients with typical receiver coils (such as WPC receiver coils) of values <0.5 and even <0.3 or <0.2. We have built racetrack charger coils of 190 mm and 300 mm lengths and observed good power transfer efficiency (of ~68% DC-DC total system efficiency) and consistent power transfer and efficiency across the long axis (X axis) of such coils to typical WPC receiver coils. We have built several similar coils of 190 mm length (along X axis) with different widths. The resonant capacitor for each coil was optimized for its inductance. The DC to DC efficiency (defined as ratio of DC output power from a receiver to DC input power to the charger) of a 40 mm diameter receiver coil (a typical size used in mobile devices and phones) as a function of location along the Y axis for the different coils is shown in FIG. 8. The dimensions for the coils shown are for outer dimensions of the coil. The measurements were taken with offset of zero at the center of the charger coil. As the center of the receiver coil is moved along the Y axis away from the center of the charger coil, the overlap of the coils in this direction decreases and the efficiency drops. All measurements were taken with the same power being delivered from the receiver. We can see that coils with larger outer widths (for example going from 44 mm to 65 mm) can provide wider position freedom and flatter response as the coil to coil center offset increases. However, the maximum efficiency also decreases from 68% to ~60%. The coupling coefficient between a typical coil of 190×44 mm race track charger coil and a typical 40 mm diameter or square WPC receiver coil is measured to be ~0.3.

Figure 9:
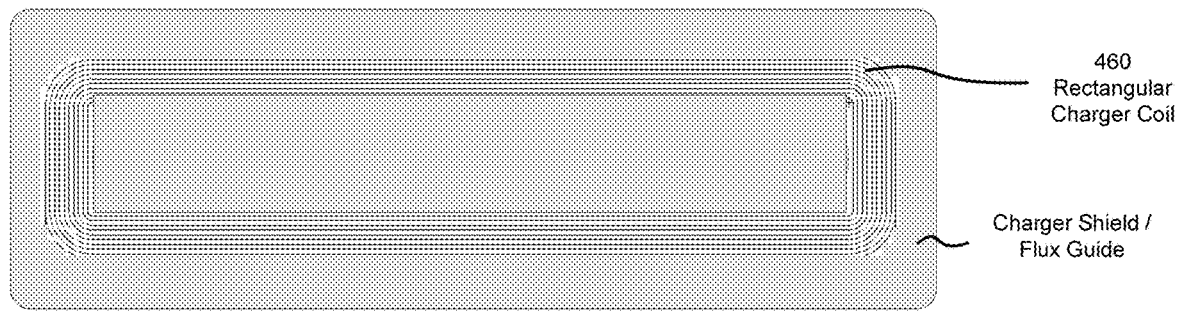
FIG. 9 is a simplified diagram illustrating an exemplary rectangular pattern charger or power supply coil assembly and a corresponding receiver coil assembly according to some embodiments of the present disclosure.
Figure 10:
FIG. 10 is a simplified diagram illustrating an exemplary charger or power supply coil assembly comprising 2 separate coils, each optimized to charge or power a different size receiver coil optimally according to some embodiments of the present disclosure.

In an embodiment shown in FIG. 9, a racetrack coil with square sides (Rectangular shaped coil 460) is shown. This is a variation that may be used for ease of manufacturing purposes and would provide similar results. Various variations of the race track shaped coil can be used to provide optimum power transfer efficiency and other performance to receiver coils of different size and shape or charger standards such as Wireless Power Consortium standard, Powermatters Alliance, AirFuel Alliance, or Apple standard. It is also possible for a charger to be designed with multiple charger coils integrated into a common charger and displaced in location or overlapping each other to provide optimum power and efficiency to different types of receiver coils and or to extend the active surface area of the charger. FIG. 10 shows an embodiment whereby 2 distinct coils with the same centers are placed inside each other. Coil 1 (480) may be optimized to deliver power optimally to one type of receiver coil and coil 2 (500) is optimized for another type or size of receiver coil. As an example, Coil 1 may be optimized for charging a mobile phone with a larger receiver coil and Coil 2 may be optimized for a watch or audio device (earphone, earbud, etc. or hearing aid as an example) with a smaller coil. The 2 coils may share the same magnetic or charger shield/ferrite layer placed behind or/and in front of the coils or the structure may incorporate multiple different ferrite layers and materials optimized for each coil. For simplicity we have here shown 2 coils with the same centers but the coil centers may be displaced from each other's centers or have different shape and/or size or operate at different frequencies. The coils may also be more than 2 to accommodate even more types of devices or charging standards or protocols. The coils may also be manufactured by using wires, Litz wires, Printed circuit board (PCB) coils, stamped or formed metal patterns, using non-metallic conductive materials such as plastics, etc. or a combination thereof.

Figure 11:
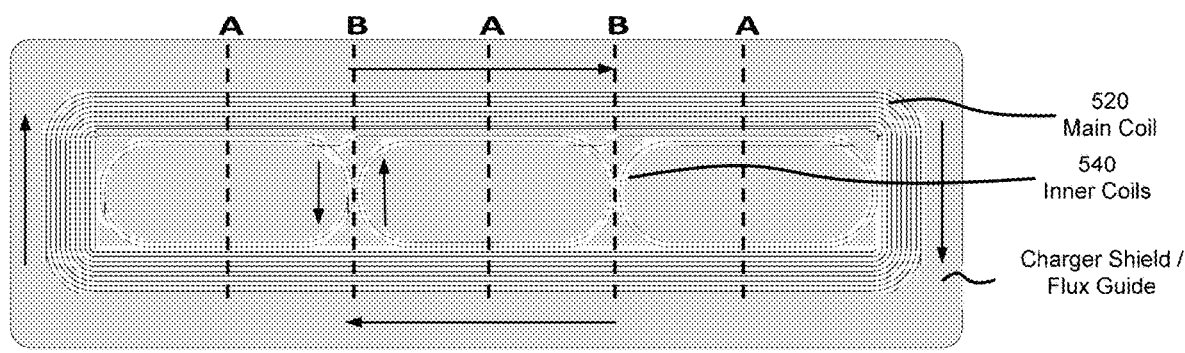
FIG. 11 is a simplified diagram illustrating an exemplary charger or power supply coil comprising a main coil and an inner coil that are connected and in series with each other according to some embodiments of the present disclosure.
Figure 12:
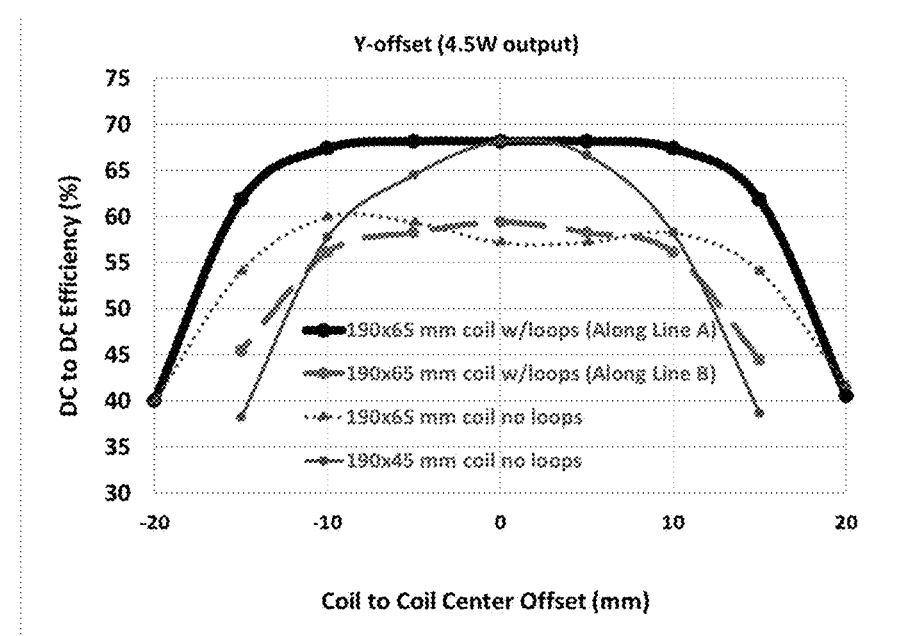
FIG. 12 is a simplified diagram illustrating the efficiency of charger or power supply coil assemblies shown in FIGS. 9 and 11 as a function of receiver center coil placement with respect to charger or power supply coil center according to some embodiments of the present disclosure.
Figure 13:
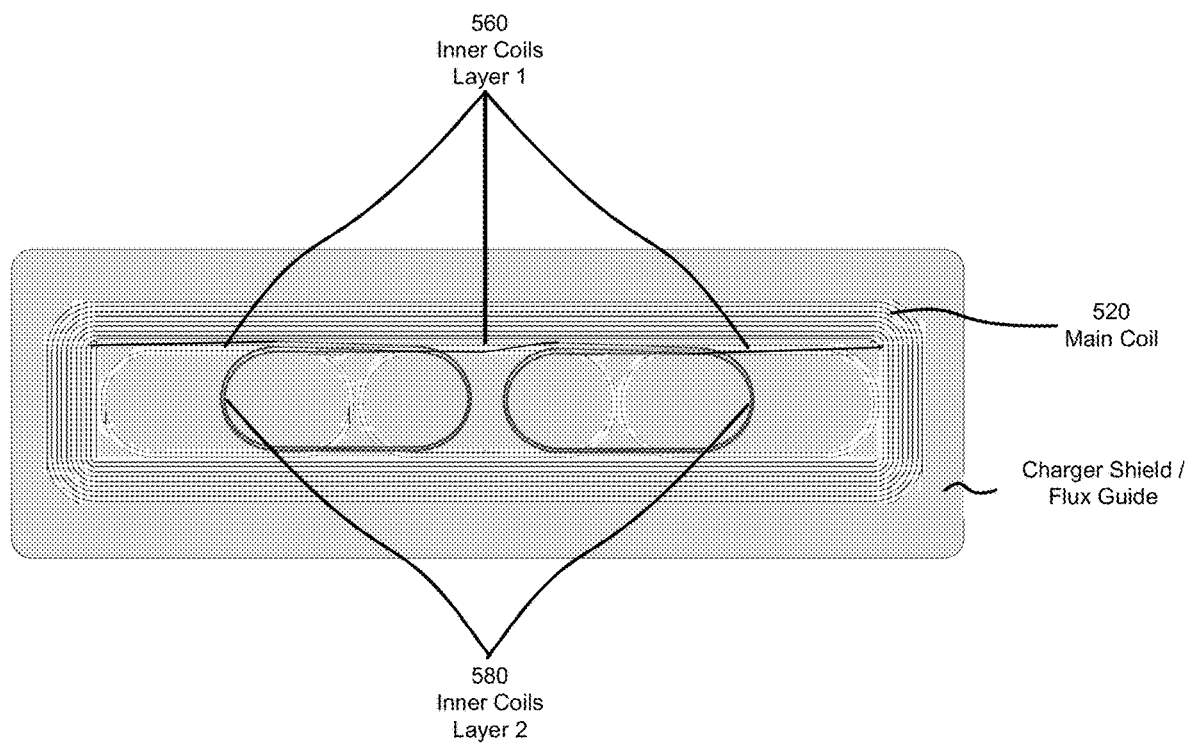
FIG. 13 is a simplified diagram illustrating an exemplary charger or power supply coil comprising a main coil and two inner coils that are connected and in series with each other according to some embodiments of the present disclosure.

To overcome the reduction of the efficiency with wider coils (in the y direction), in an embodiment shown in FIG. 11, to the main coil 520, we have added a series of inner coils 540 comprising extra loops of several turns each in the central area of the main coil. These inner coil or coils are created by extending one end of the same Litz wire that the main coil is made of and forming the inner loops in a manner that both the main coil and the inner coils have the same clock-wise or counter-clock-wise wire turn and pattern so that during each cycle of the AC current flow through the main coil and the inner coils in the same clockwise or counter-clockwise direction (as shown by arrows in the Figure and the resulting magnetic field from the coils would add constructively and not cancel each other out along the upper and lower regions of the inner coils. We have found that a series of inner coils with a loop diameter similar to the diameter of typical receiver coils to be used with the charger would enhance the efficiency of the overall charger system. In FIG. 12, we show the measured efficiency along lines A and B across the coil structure of FIG. 11 and compare with a similar coil with similar dimensions (190×65 mm) but no inner loop coils and with a similar constructed coil of 190×45 mm dimension. As can be seen, the introduction of the inner loop coils has increased the efficiency of the coil (compared to structure with no loops such as shown in FIG. 9 at certain locations (along A lines and their vicinity) by about 10% while providing similar or slightly lower efficiencies at other locations (along B lines and other similar locations in the structure). Furthermore, the efficiency of the coils is flat over a larger segment than other embodiments. For example, along A lines, the efficiency is around 68% over a ±10 cm distance from the centerline exceeding the performance of other coil patterns or structures. The main reason for this increase of efficiency is that by introduction of the inner coils in the charger coil, we have increased the coupling coefficient between the charger and a typical receiver coil at most locations of the coil thus increasing the wireless power transfer efficiency between these coils. As we have shown, it is possible to increase the efficiency and position freedom of the system by incorporating the inner coils in to the coil structure. To illustrate the reason for reduction of efficiency along the B lines, in FIG. 11, we have shown the direction of current flow in the wires or paths in the main and the inner coils during half a cycle of the AC applied current. The lower efficiencies along B lines are a result of the current in the inner coils along 2 adjacent loops traveling in opposite direction (as shown in the left coil) at these locations and thus the resulting magnetic field during any half cycle of the applied AC current cancelling any beneficial effect of introduction of the loops into the structure. To overcome this, in an embodiment shown in FIG. 13, it is possible to introduce additional similar or different loop coils with centers along the B lines with similar current flow direction (clockwise or counter-clockwise) to "fill in" these lower efficiency areas. Since these 2 new inner coils Layer 2 (580) will overlap the 3 existing inner coils Layer 1 (560), they would be wound on a separate layer (layer 2) on top of or below the other inner coils thus there will be some physical overlap between the 2 layers of inner coils. Similarly, in a PCB coil design, multiple PCB layers or a combination of wires and PCB or stamped or formed, etc. coils or paths can be used to build these more complex structures.

In the above embodiments, the coil or coils are typically attached to or built on top of a charger shield/flux guide layer as shown. In this document, we use the term magnetic material or layer interchangeably with charger shield or flux guide layer. The magnetic layer typically comprises one or more ferrite, ferromagnetic or soft magnetic layer or nano-material or ferro-fluid, or a combination of such with desired magnetic properties. Typically, the inner central section of the coils as shown also contains the charger shield/field guide layer to help contain and guide the flux to optimize energy flow to the receiver coil. These shield/flux guide/magnetic layers can comprise rigid or flexible material which is sintered, cast, poured, pressed, fired or machined into the desired shape and can have a thickness from 0.1 mm or less to several mm or more depending on the application and power requirements of the charger. The real ($\mu'$) and imaginary part ($\mu''$) of the permeability of the material is designed to optimize efficiency and shielding necessary at the frequency of operation. A typical material for a charger for mobile devices in the range of 5-50 W each would comprise a rigid or flexible sheet of 0.2-0.5 mm thickness of ferrite material of MnZn or NiZn with real permeability of 50 or higher (typically 200 or more) and an imaginary permeability as low as possible. The MnZn are generally used at frequencies below 3 MHz and exhibit a higher permeability ($\mu'$) and saturation induction levels (Bsat). NiZn ferrites have a very high resistivity, are most suitable for frequencies over 1 MHz and high temperature applications.

In this document, we describe a Coil Assembly as being one or more coils (whether the same current flows through all the coils or they are connected to separate drive electronics or have separate currents flowing through them) and any charger shield/flux layer or magnetic layer and any electric or electronic devices for measurement of temperature or proximity of a receiver coil. It can also include metal or thermally conductive layers for any possible heat removal or additional circuitry or antennas. Such a coil assembly may comprise separate parts attached to each other or embedded in a matrix of plastic, Thermoplastic, rubber, silicone or other organic or non-organic typically non-electrically conductive material.

In the above embodiments, in one embodiment, the coils are arranged such that the same current flows through the entire coil assembly (comprising the main coil and the inner coils). However, in general, it is possible to drive each section of the coil structure separately or at different frequencies or phase. As we have seen above, using the same current in the main and the inner coil may create regions such as along the B lines in FIG. 11 that would have lower efficiencies due to this cancellation effect. In other embodiments, to reduce or eliminate the destructive interference of magnetic field created by the flow of current in adjacent or close by wires or current paths at various locations of the coil structure, one can take advantage of the shielding effects of the charge shield/flux guide magnetic layer used. FIG. 14 shows an embodiment whereby the clockwise motion of current (during half cycle of the applied current) in all the inner coils and main coil is maintained and the opposing current flow flowing in the paths along the Y-axis (i.e. vertically in FIG. 14) are passed through vias or holes (600) in the charger shield/flux guide magnetic layer to be behind the coil structure layer into the −Z direction compared to the X-Y coil Structure plane in FIG. 14 and then again brought back through holes or vias in the magnetic layer into the +Z direction compared to the X-Y coil structure plane shown to flow on the top layer. Since the charger shield/flux guide/magnetic layer is typically thin (several mm), the vias, cuts or holes can be achieved by drilling, cutting, or other means or be implemented during the manufacture of the magnetic layer material. The passage of the wire/path behind the magnetic layer would shield any resulting magnetic field in that section from the top layer of the coil structure and thereby would not reduce the magnetic field along B lines created by the other parallel set of wires with opposing current flow direction at that location. This would allow us to achieve our desired effect of increased efficiency and position freedom along all X-Y locations of the coil Assembly.

In above embodiments, several methods for increasing the efficiency and position independence or position freedom of one or more receivers on the charger is described. To further increase the position freedom in the Y axis (width) of the coil, it is possible to use rows of inner coils as shown in an embodiment shown in FIG. 15 to further extend the width and position freedom of the charger coil in the Y direction. One can note that these coils can be connected such that the same current flowing in the outer main coil flows through the inner coils thus simplifying the electronics used for driving the charger. In another embodiment, it is possible to drive one, some or all of the inner coils with one or more additional set of drive electronics such as shown in FIG. 2 and the frequency and/or phase between the AC signals driving the various coils can be adjusted to optimize power transfer to one or more receivers on the charger.

Figure 14:
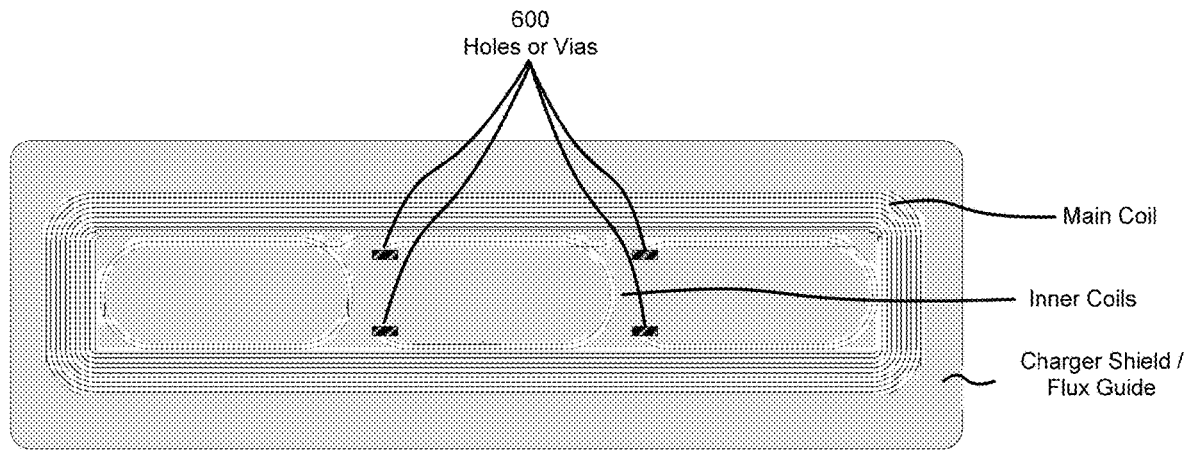
FIG. 14 is a simplified diagram illustrating an exemplary charger or power supply coil comprising a main coil and an inner coil that are connected and in series with each other and a method to enhance efficiency in certain areas by passing certain portions of the coil wire or path under the charger shield or flux guide layer according to some embodiments of the present disclosure.
Figure 15:
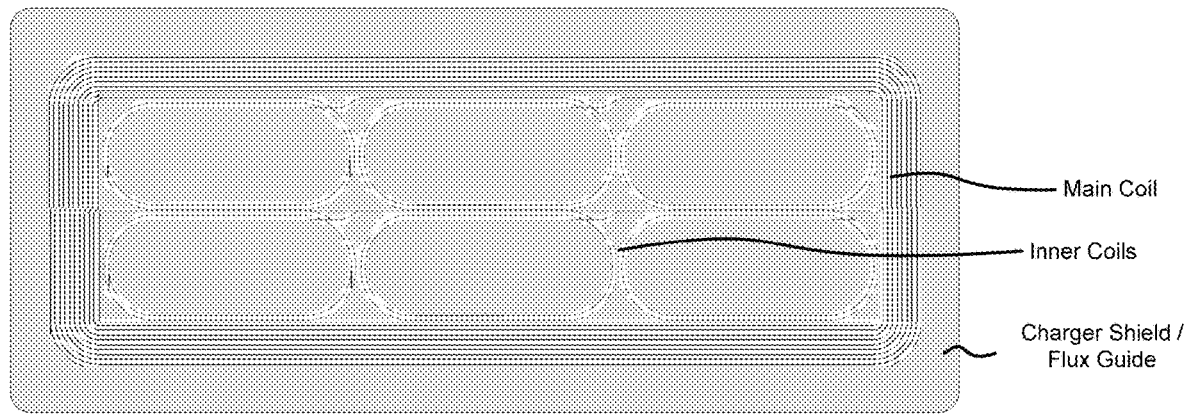
FIG. 15 is a simplified diagram illustrating an exemplary charger or power supply coil comprising a main coil and an inner coil structure that are connected and in series with each other according to some embodiments of the present disclosure.

It can be noted that sections exist in the coil architecture of FIG. 15 whereby currents in paths or wires close to each other would flow in opposite directions (such as along the horizontal line dissecting the structure in 2 and along paths similar to the B lines in FIG. 14). To decrease or eliminate this effect, in an embodiment and variation of the coil structure of FIG. 15, it is possible to pass the paths or wires through vias or holes/cuts in the charger shield/flux guide magnetic layer to be behind the coil structure (as shown in FIG. 14) and then again brought back through holes or vias in the magnetic layer into the coil structure plane to flow on the top layer. In another embodiment shown in FIG. 16, to overcome the opposing current effect, it is possible to have 2 rows of inner coils separated by a gap of similar size so that a receiver placed horizontally along the top or bottom rows has the higher efficiencies and position freedom described in FIG. 11 and with data in FIG. 12 and for a receiver placed along the middle row of the coil structure, the direction of charger current flow on the top of the row and the bottom of the row are opposite so provide a constructive magnetic field creation in the center thus also providing good efficiency and power transfer.

Figure 16:
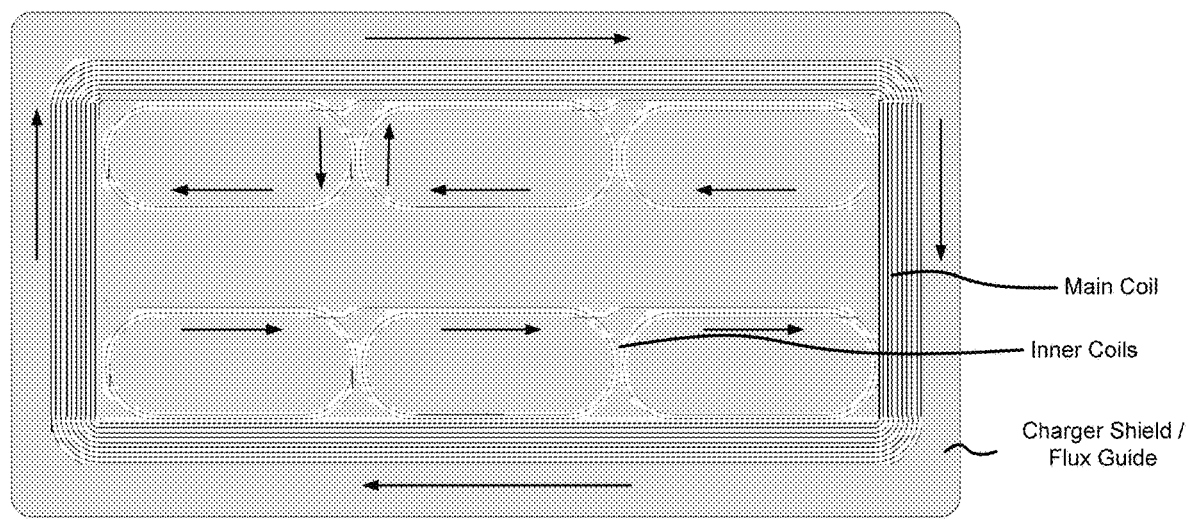
FIG. 16 is a simplified diagram illustrating an exemplary charger or power supply coil comprising a main coil and an inner coil structure that are connected and in series with each other according to some embodiments of the present disclosure.

However, one can note that if the coils are arranged such that during each half cycle of the current flow through the inner coils, as shown in FIG. 16, areas of opposing adjacent current flow as shown on the upper left side and as existing in earlier structures exist. To overcome this effect, in another embodiment shown in FIG. 17, adjacent wires or paths with opposing current flow are eliminated by passing the wire or path to the back side of the ferrite as described earlier. In addition, to create better coupling between and receiver and the transmitter along the middle row, vertical current paths (along the Y direction) are introduced. However, it is clear from this Figure that areas such as in the right and left side of the center row exist whereby the direction of the current flow around the section is not all in a clock-wise or counter-clockwise direction during half of the AC current cycle thereby reducing the efficiencies in these areas.

Figure 17:
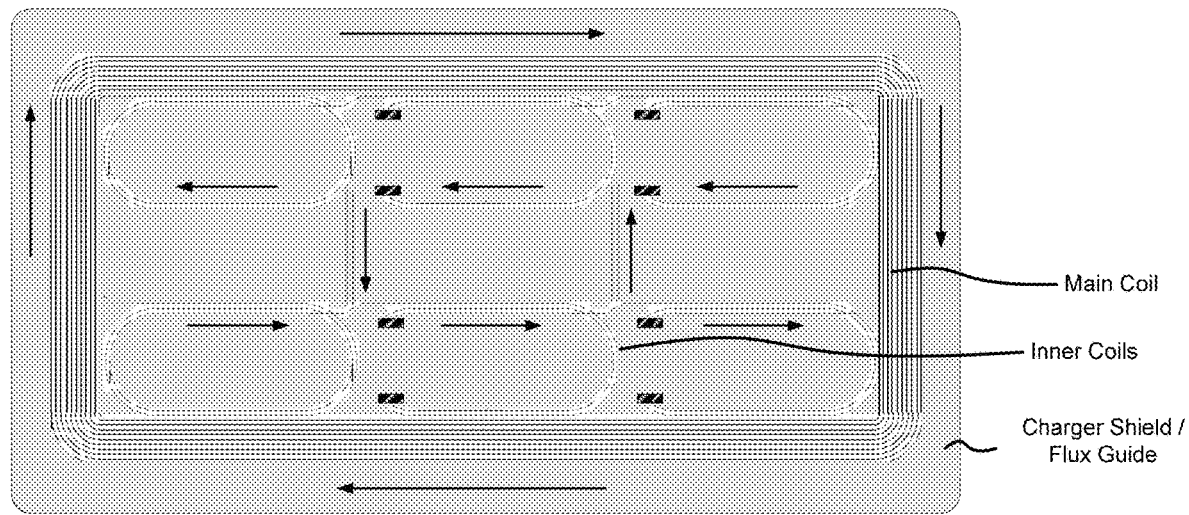
FIG. 17 is a simplified diagram illustrating an exemplary charger or power supply coil comprising a main coil and an inner coil structure that are connected and in series with each other and a method to enhance efficiency in certain areas by passing certain portions of the coil wire or path under the charger shield or flux guide layer according to some embodiments of the present disclosure.
Figure 18:
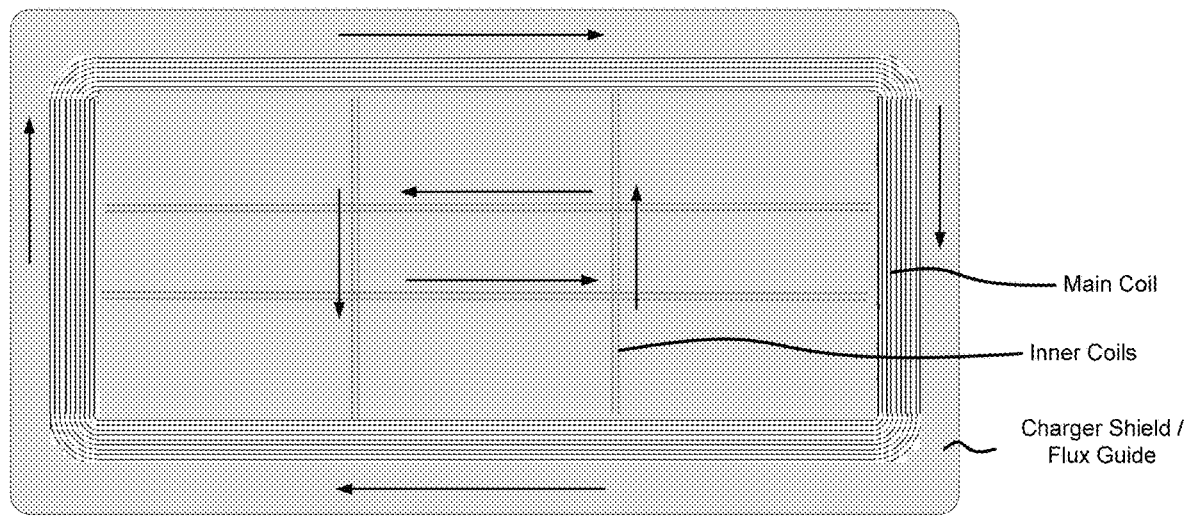
FIG. 18 is a simplified diagram illustrating an exemplary charger or power supply coil comprising a main coil and an inner coil structure that are connected and in series with each other according to some embodiments of the present disclosure.

In a yet other embodiment, to simplify the structure of the Coils, as shown in FIG. 18, a coil structure comprising outer coils and an inner structure of crossed lines, wires or paths that construct smaller areas comparable to the size of a typical receiver coil can be constructed. In this structure, the paths or wires and direction of current flow during each half cycle of an AC applied current is designed such that at most locations on the surface of the coil structure the direction of current flow in the paths, wires or lines results in additive magnetic fields yielding higher efficiencies. However, as in FIG. 17, areas with opposing current flow direction around the area (such as the top and bottom center) remain.

In the above embodiments, we have discussed methods for construction of chargers to deliver power to a receiver within the Near Field region (typically described as much closer than a wavelength to the coil or antenna) of the magnetic field generated by a charger coil with antenna or coil length much shorter than the generated wavelength. As an example, at a frequency of 100 kHz, the wavelength of the field (~3000 m) is much bigger than the length of a typical wireless charger coil (10s of cm up to several m). Thus, the generated magnetic field is attenuated rapidly away from the coil and does not propagate. A receiver coil in this "near field" range would be able to extract a large portion of the power from the transmitter coil. This region is typically described as a region whereby the presence of the receiver coil affects the performance of the charger coil or where some coupling between the coils exist. Another characteristic of the Near field region is that by appropriate design of electronics and the antenna (or coil), one can generate an alternating frequency mostly or exclusively magnetic or mostly or exclusively electric field.

In an embodiment described here, a near field magnetic wireless charger or power supply is combined with a far field wireless charger or power supply in one device or housing or in a manner whereby the two chargers or power supplies are attached or near each other such that a user can charge or power one or more devices or batteries with higher power or charge rate requirements (for example exceeding 1 W of received power for charging) by placing the device or battery on or near the charger or the section for near field charging and also simultaneously be able to charge or power one or more low power devices or batteries at up to some farther distance and at a different frequency using the far field or radiative field from the far field charger section or component.

In an embodiment, it is possible to envision a charger pad on a table whereby one can place one or multiple devices such as mobile phones, tablets or laptops or batteries adhering to Wireless Power Consortium (WPC) or other charging standards (or proprietary protocols) and at the same time be able to place one or multiple electronic smart watches, earbuds and hearing aids or other wearable electronics or batteries on or near the surface of the table or the pad or nearby where they can receive power at different orientations and locations. Such a combination near field and far field charger or power supply would be able to provide convenient charging to a variety of devices and can have many advantages over current implementations.

In the above discussion, we have focused on coil structure embodiments to improve position freedom and efficiency of a charging coil and system. We now turn our attention to the overall architecture of a charger and ways of improving the user experience and usefulness of wireless charging in different applications. In most wireless chargers, the power drive electronics, the digital electronics for communication and control as well as data transfer between the charger and the device with the receiver embedded in it or connected to it or the data transfer between the charger and a system where the charger is incorporated (such as a vehicle, mobile device, computer, network in office, home, restaurant, coffee shop, hotel, etc.) and the charger coil are co-located into one package. In other words, in a typical simple charger, the charger drive electronics and the charger coil assembly are close by (several mm to cm) and packaged together in a plastic, rubber, thermoplastic, Silicone, leather or other non-metallic housing. The charger housing may also contain LEDs, displays or LED lighting or the charging surface may be partially or completely covered by LCD or electroluminescent lighting or display for decorative purposes or to show information or state of charge or operate as an interactive touch sensitive display such as a tablet display. Combining the coil assembly and the electronics is typically done to save space and to provide a small, low cost and low loss charger. However, this approach suffers from several fundamental flaws:

In a typical wireless charging system, the main sources of loss can be summarized as the loss in charger power drive electronics comprising switching and other losses, the charger coil to receiver coil power transfer loss and the receiver loss comprising rectification and any possible DC-DC conversion and other losses. In a mobile device charging application to charge devices at 5 to 15 watts power delivered, the losses from the charger, coil to coil and receiver losses can be about 10% each resulting in an overall ~70% DC-DC power transfer efficiency. For a wireless charger system delivering 5 W of power to a device or battery from a receiver, about 2 W of additional power is lost in the 3 areas mentioned above. As users demand faster charge rates and new mobile phones and other devices charge at rates of up to 15 W, the amount of power lost increases further. For example, for 15 W delivered, 6 W of power can be lost essentially as heat as described above. In a small typical charger device, the electronics are usually placed under the charger coil and connected with a Litz wire or alike of several mm to typically less than 2-3 cm length in the package. In these implementations, the electronics, coil and the receiver can generate the total lost heat in a small area under the mobile device causing a large temperature increase at the charger/mobile device interface. Furthermore, since the battery charging process is an exothermic process, the battery of the device (typically placed behind the receiver coil) further creates heat during charging that adds to the temperature around this location. As these effects are all additive and can create a positive loop for further loss and heating, the heat generation has created problems for practical implementations of wireless charging. As charging rates and wireless power transfer levels increase, this thermal load at and around the interface and the charger increases. As an example, Samsung WPC chargers for mobile devices were able to charge mobile devices without active cooling at 3 and 5 W levels. But as power levels delivered to the mobile devices have increased to 6.6 W, 9 W and beyond, it has been necessary to add a fan to the charger to remove the heat generated in the charger and the charger/receiver interface.

Figure 19:
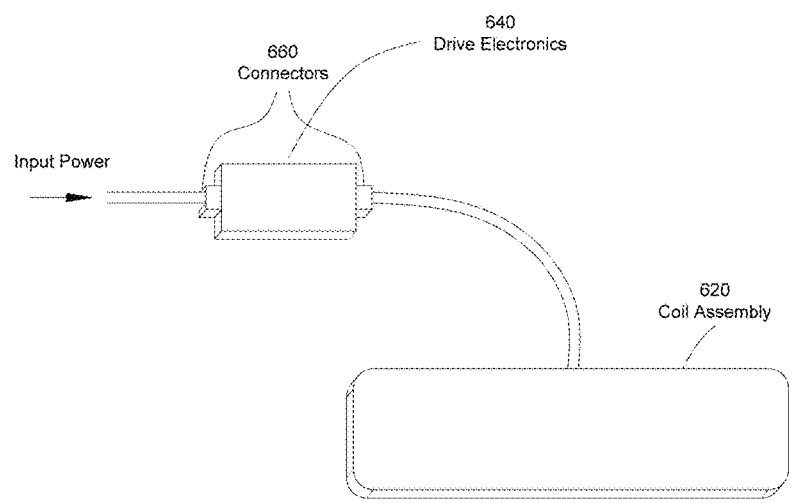
FIG. 19 is a simplified diagram illustrating an exemplary charger or power supply coil assembly and driver electronics that are separated from each other and connected by a cable according to some embodiments of the present disclosure.

In an embodiment described here, the wireless charger is constructed of a drive electronics section and a coil assembly that are separated physically (as shown in FIG. 19) by more than several cm and typically more than 5 or 10 cm and typically by 10's of cm so that the Coil Assembly 620 has minimal or no electronics components and is connected to the drive or control electronics 640 placed in a separate housing. In an embodiment, to avoid loss in the cable carrying the AC power signal between the Drive Electronics to the Coil Assembly over distances of several cm to m, Litz wire of sufficient number of strands and gauge is used for the frequency of operation as to provide a low loss high frequency path. Using FIG. 2 as an overall example of the charger architecture, the coil assembly may include the coil, optionally resonant capacitors and optionally some heat sense elements such as thermocouples or thermistors, etc. connected by 2 or several wires or cables to a housing containing the rest of the drive electronics. By separating the drive electronics from the transmitter coil assembly, as described above, up to ⅓ of the source of power loss may be removed from the immediate area of the charger/receiver interface thus greatly relieving the source of the heat in this critical volume. To avoid loss due to increased spacing between the charger drive electronics and the coil, low resistivity wires and cables at frequency of operation of the charger can be used. For typical frequencies of operation at 100 kHz to 210 kHz for WPC chargers for mobile devices, 80-90 kHz for EV charging and ~20 kHz for bus charging and other charging standards at several MHz, use of appropriate Litz wires can provide a low loss path between the drive electronics and the coil assembly. While it may appear that this high frequency wire may cause high amounts of Electromagnetic emission which is a concern for interference with nearby electronics or for its effects on humans, a pair of wires with equal magnitude and phase AC currents flowing in opposite direction in general create AC magnetic fields in their vicinity that cancel each other out. In practice, we have not observed a significant amount of EMI nearby. However, we note that a charger constructed in this way can operate at much higher power levels without thermal issues noted above. In an embodiment, the 2 or more Litz wires from the drive electronics to the coil assembly can be made into a single cable and to further reduce EMI, the Litz wire pairs for each coil can be twisted and/or be manufactured or include metal, foil or metal coated polymer or other shielding. The use of twisted pair wires with a given twist rate per length of cable can reduce the EMI generated nearby further. In addition, metal or foil shielding can be used to further isolate the environment if necessary. However, care must be taken to ground the shieling layer. More complex cables including the coil Litz wires and other wires for thermal sensors and/or other antennas or other components in the coil assembly can also be bundled into the same or a number of cables to connect the coil assembly and drive electronics.

In addition, to further provide EMI reduction, the electronics may be housed in a metal housing and the metal housing and connectors isolated to create a Faraday cage to reduce emission from the entire drive electronics and cable assembly. It is also possible to incorporate thin metal or conductive layers, films, structures, mesh or mesh fabric incorporated or sputtered, sprayed or conductive ink or other material applied or incorporated into the housing walls or the coil assembly to reduce unwanted electromagnetic emission from these components. Use of conductive plastics or other materials to achieve this is also possible.

It may seem that incorporation of such conductive material in the top surface of the coil assembly would also reduce or absorb the AC magnetic field responsible for wireless power transfer due to generation of eddy currents. However, the skin depth of typical metals at frequency of typical operation of 100-205 kHz and around 6.78 MHz is quite thick (~200 μm and 20 μm for copper respectively). The loss created by a thin layer of metal is highly frequency dependent and increases as the frequency increases. Such an effect can be used by incorporating a metal or conductive layer at the appropriate thickness and material composition that will allow high transmission of electric and magnetic fields at low frequencies (100-205 kHz and 6-7 MHz range) for wireless power transfer and block higher frequencies to reduce unwanted electromagnetic noise and interference with nearby devices.

In an embodiment, a thin continuous metal layer or multiple layers or a non-continuous or perforated metal layer or a periodic structure, mesh, metal comb filter, etc. either free standing in the form of a sheet, film, fabric, etc. or printed on a backing such as a printed circuit board (PCB), flexible PCB, mylar or coated on a plastic or other sheet such as mylar is incorporated on top of the coil and designed to allow magnetic field transmission for wireless charging while substantially cutting off other frequencies that may interfere with other nearby systems. Appropriate choice of materials, thickness and periodic pattern or mesh structure can essentially filter out such unwanted frequency in a range or selectively as desired. Some structures can be designed to act as comb filters to eliminate or decrease certain frequencies and their harmonics. As described earlier, any of the structures discussed above by incorporating metallic or other electrically conductive layers may also provide surface heat spreading and dissipation so as to provide an additional benefit in the overall coil assembly structure.

In another embodiment, in automotive and other applications, Electromagnetic interference emitted from the charger at 100-205 kHz may interfere with Low Frequency AM radio (148.5-283.5 kHz) receiver or other device or services operating at the wireless charger frequency or a harmonic of the charger frequency nearby. To reduce this interference, some of the methods discussed above may be used. As an example, the use of a metal housing for the electronics to reduce all frequency emissions or a thin metal or conductive layer to reduce emissions at frequencies higher than the fundamental frequency of operation (thus reducing emissions at the harmonics) can have a significant effect on the use of wireless chargers in these applications. In another embodiment, the frequency of the charger coil power drive signal can be designed or dynamically adjusted to avoid frequencies that would cause unwanted interference in the environment of wireless charger operation. For example, using this frequency avoidance technique in automotive environments, the charger may be designed to operate at frequencies below the minimum of the AM radio frequency (148.5 kHz) or the vehicle may signal through its CAN or other network to the wireless charger dynamically if AM radio is activated or what frequency of AM radio is turned on so that the wireless charger reconfigures to avoid operation near that frequency to avoid interference. In addition, in another embodiment, while maximum allowed emitted power levels from intentional and unintentional radiators have been established by the FCC in USA and other equivalent bodies world-wide, it is possible to reduce these peak emitted power levels by varying slightly in time (or dithering) the frequency of operation of the charger so that the peak levels at any given frequency including the fundamental frequency of operation is reduced and meets the regulatory guidelines. Such a spread-spectrum frequency dithering is quite an effective method for regulatory compliance in many cases and can be combined with frequency avoidance techniques above to allow integration of wireless chargers in complex environments.

The cable between the drive electronics and the coil assembly can be connected at both ends permanently or connectorized for ease of assembly and servicing/moving the parts. Similarly, the cable from the input power supply or source to the drive electronics can be connected permanently or connectorized to allow more flexibility, ease of assembly, etc.

In some embodiments above, we described the charger or coil assembly incorporating one or more coils or antennas for different wireless charging protocols or standards and/or to increase position freedom and/or to be able to charge receiver coils of different size efficiently and/or to enable near field and far field power transfer. But the coil assembly can also house antennas for Near Field Communication (NFC) to be able to detect NFC receivers or tags in device or cards, etc. to either read data from them or to detect their proximity and disable wireless charging during their presence in order to avoid power transfer to the NFC circuit embedded. In another embodiment, a cellular or communication boost antenna and/or circuit is incorporated into the coil assembly to allow the communication antenna on a phone being charged on the pad to couple to the antenna and boost its reception. In an embodiment shown in FIG. 20, as an example, the coil assembly, in addition to a wireless power charger coil 680 and magnetic/shield ferrite layer 700 may contain additional Mobile phone communication boost antennas 720 and NFC/RFID antennas 740.

Figure 20:
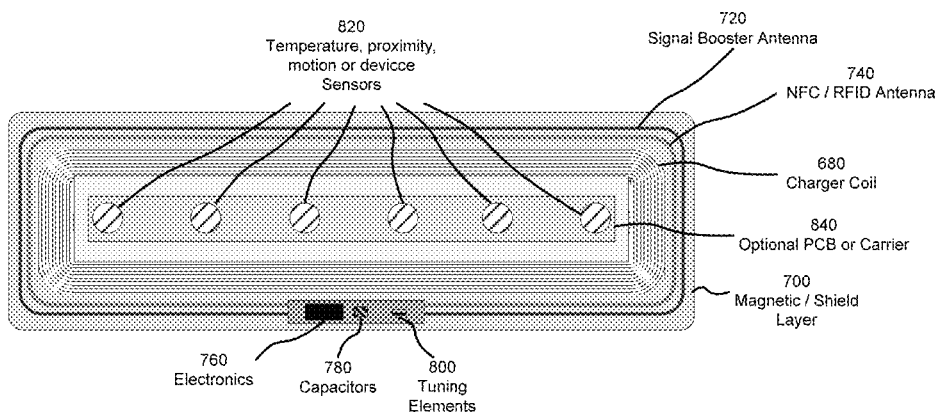
FIG. 20 is a simplified diagram illustrating an exemplary charger or power supply coil assembly that comprises one or more charger coils and magnetic field/shield layer and other antennas and electronics components according to some embodiments of the present disclosure.

As shown in FIG. 20, the coil assembly further may contain the resonant capacitors 760 for wireless charging or other circuitry or electronics 780, and/or tuning/impedance matching or coupling elements 800 for the higher frequency antennas or coils incorporated within.

In another embodiment, the coil assembly may contain one or more temperature, proximity, capacitive or other sensors 820 to monitor temperature, motion or proximity of any receivers or devices to be charged on the charger or to detect presence of foreign or live objects. Signals from such sensors and one or more coils and/or electronics may be bundled into one or more multi wire cables or be connected to a circuit board and digitized or combined before connecting to the main drive or control electronics. In cases where the coil assembly is separated by a distance from its drive or control electronics, one or more cables, wires, Litz wires and/or twisted wires or twisted Litz wires, etc. are used to connect the coil assembly and the electronics. To reduce the number of wires or cables between the coil assembly and the drive electronics, some circuitry may be incorporated into the coil assembly to detect various signals and multiplex or digitize them to transmit to the drive electronics board. In an embodiment, the thermistors, thermocouples or a continuous thermal sensor layer, capacitive or other sensors may be installed on a PCB or carrier 840 incorporated into the coil assembly to measure the temperature or sense foreign or live objects on or near the surface of the charger may be directed to a circuit and or microcontroller in the coil assembly to detect the various signals and communicate through a common wired or wireless method ($I^2C$, UART, USB, SPI, WiFi, Bluetooth, Zigby, etc.) these signal over a wired or wireless method to the drive or control electronics. This wire or cable assembly between the coil assembly and the drive or control electronics may be permanently fixed at both ends or terminated at the Coil Assembly and/or the drive electronics housing by multi-pin connectors. The ability to separate the coil assembly and the electronics at the coil assembly end or the housing end allows upgrade of functionality and replacement of either part in case of failure. It also has additional advantages in assembly and installment of parts in many infrastructure situations.

As discussed above, the coil assembly may contain one or more near field and/or far field power transmission coils or antennas, boost and NFC antennas, one or more ferrite and/or metal layers, optional electronics boards, capacitors, antenna tuning elements, thermistors or other heat or capacitive or other sensors, displays or LEDs or other lighting, and connectors for cabling and be housed in a plastic, rubber, Silicone Thermoplastic, wood, leather, etc. or other external housing or mold. Using flexible ferrates, Litz or regular wires and flexible PCBs for mounting of optional electronics components, displays, etc., the entire coil assembly can be manufactured with a flexible housing or embedded completely in flexible material such as rubber, Silicone or leather to provide a water proof or water-resistant unit that can withstand accidental spills or be used in under water applications. As discussed above, heat removal at the charger/mobile device interface hotspot is in some cases a limiting factor in the amount of power that can be delivered to a receiver or device being charged or powered. In an embodiment, methods will be used to remove the generated heat efficiently laterally in the surface and/or vertically to a lower layer in contact with the table surface to keep the temperature rise to a minimum. As an example, plastic, rubber, TPU, ceramics or metal layers or other material designed for high thermal conductivity can be used. Since the generated AC magnetic from the coil assembly is created behind the top charger surface, the surface will need to be able to transmit the magnetic field. A continuous thick metal layer is therefore not suitable for this surface. However, use of a thin metal layer or a non-continuous or perforated metal layer or a periodic structure, mesh, etc. either free standing in the form of a sheet, film, fabric, etc. or printed on a backing such as a printed circuit board (PCB), flexible PCB, mylar or coated on a plastic or other sheet such as mylar at or below the top surface layer may be possible to allow magnetic field transmission for wireless charging (as described earlier) as well as accomplishing heat transfer to eliminate or reduce hot spots. The large surface area of the charger coil assembly for multi-device chargers described above (such as shown in FIGS. 9-22) provides advantages for the heat removal. As the heat is generated at the charger/receiver interface, it can distribute laterally across the top surface of the charger and can be transferred to surrounding environment by convection. The larger surface area of a multi device charger provides better convection cooling. It is also possible to incorporate higher thermal conductivity materials, ceramic, metallic or conductive material into the coil assembly or the charger housing or to deposit or sputter or incorporate by other means higher thermal conductivity layers into the structure to help with heat removal.

In an embodiment, the top layer or the entire charger or coil assembly is manufactured by use of new thermally conductive plastics. Whereas copper and aluminum have thermal conductivities in the range of 385 and 205 W/mK (Watts/meter-° Kelvin) respectively, typical conventional unfilled thermoplastics have a thermal conductivity of around 0.2 W/mK. It is possible to increase the thermal conductivity of plastics by adding additives to these compounds. Among the most commonly used heat-conductive additives are graphite carbon fibers and ceramics such as Aluminum Nitride and Boron Nitride. Graphite fibers conduct electricity as well as heat, which suits them to applications where RFI shielding is required. By contrast, the ceramic additives are electrically insulative. Most thermally conductive plastic compounds typically have 10 to 50 times higher conductivity (1-10 W/mK) than typical thermoplastics. One firm, Cool Polymers, offers products with 100 to 500 times the conductivity of a base polymer (10-100 W/mK) approaching the thermal conductivity of metals. For use in wireless charging cases, in general, non-electrically conductive plastics are preferable. It may be therefore preferable to use plastics containing ceramics such as Aluminum Nitride or Boron Nitride. However, use of conductive additive may also be possible. The method for heating and loss of magnetic field energy to metals is through generation of Eddy currents and the resistivity of metals. In an embodiment, the coil assembly may contain metal sheet or 3-d structures for heat removal or distribution. However, if a structure incorporates cuts, perforations or patterns to reduce or eliminate circulating currents that may be generated by the magnetic field, it can be minimally absorbed by the magnetic field and can provide beneficial heat removal and distribution functions. In an embodiment, plastics may be loaded with metal particles that are isolated (such as independent particles, balls or nano-crystals of metal in a plastic material) or non-continuous to avoid the Eddy current generation or contain patterned or aligned strands or shapes of metal particles or metal or other electrically conducting strings which are not continuous or touching or not aligned in such a way that Eddy currents can not flow easily to absorb the magnetic field. As an example, while embedding graphite fibers in plastics can increase their heat conductivity to values of 500-1000 W/mK (higher than metals), appropriate alignment or design of the fiber strand length and shape can produce material that would be non-absorptive to the magnetic field at the frequency of operation and can be used for wireless charger or coil assembly surface.

In another embodiment, it may be advantageous to design the coil assembly or the charger such that the heat generated at the top surface is pulled to the lower surface efficiently and distributed laterally by use of a high conductivity material such as a metal or other high thermal conductivity material or layer that would further transfer and distribute the heat to the table or surface where the charger is placed. In another embodiment, a pattern or design can be embossed or debossed or otherwise created on the surface of the charger or coil assembly or the drive electronics housing so that heat removal from the coil assembly or charger and the receiver interface is enhanced or increased laterally (on the surface of the coil assembly or charger) or vertically (in the plane perpendicular to the surface of the coil assembly or charger or simply the surface area of the interface is increased to provide better convection cooling of the surface. These patterns or designs may also provide some aesthetic, logo or visual benefit or be used to provide guidance for the user about usage of the charger or coil assembly. In another embodiment, it is possible to incorporate active cooling through use of fans, liquid or phase change material or other heat exchanges, Peltier coolers or other methods or a combination thereof for surface cooling. In an embodiment, the drive electronics is also incorporated in such a housing and connected to the coil to provide a fully integrated charger or power supply which only requires an outside power source or may be powered by an internal battery or be powered by a solar cell or other power source charging an internal battery to provide continuous operation without need for external power. In another embodiment as shown in FIG. 19, the drive electronics and the coil assembly are separated and one or both parts can be manufactured to be water proof/resistant and/or flexible as needed. Similar methods as described above for cooling of the coil assembly may be used for the drive electronics.

As an example of wireless charger use in infrastructure, installations of wireless chargers in coffee shops, hotel rooms, bars, restaurants, lounges, vehicles, buses, airplanes, trains, cars, kitchens, offices, tables, desks, conference tables and furniture has increased. These chargers are typically round, rectangular, or oval chargers that would be installed by cutting out a section of a table, desk, surface or furniture to fit the charger in and to secure the charger in place and route the power cable from under the surface to a power outlet. If the wireless charger is able to power a device at a distance of several mm efficiently, it is possible to thin the table or surface from the back side (under the table) and install the charger such that the top surface is not disturbed. Typically, some signage, lighting or method on the surface is attached or incorporated to notify the user where to place a device to charge. Installation of a charger in a cutout in a surface such as a table is not ideal because it affects the aesthetics or functionality of the furniture. In addition, accidental spills from liquid or cleaning fluids on the surface can enter the charger housing or electronics and cause damage or malfunction. In addition, in a coffee shop, restaurant, office or conference room setting whereby multiple wireless chargers may be installed, each individual charger would need to be cabled and powered from an outlet. The overall install process of modifying the furniture and charger attachment from below and cabling is complex, costly and time consuming.

Figure 21:
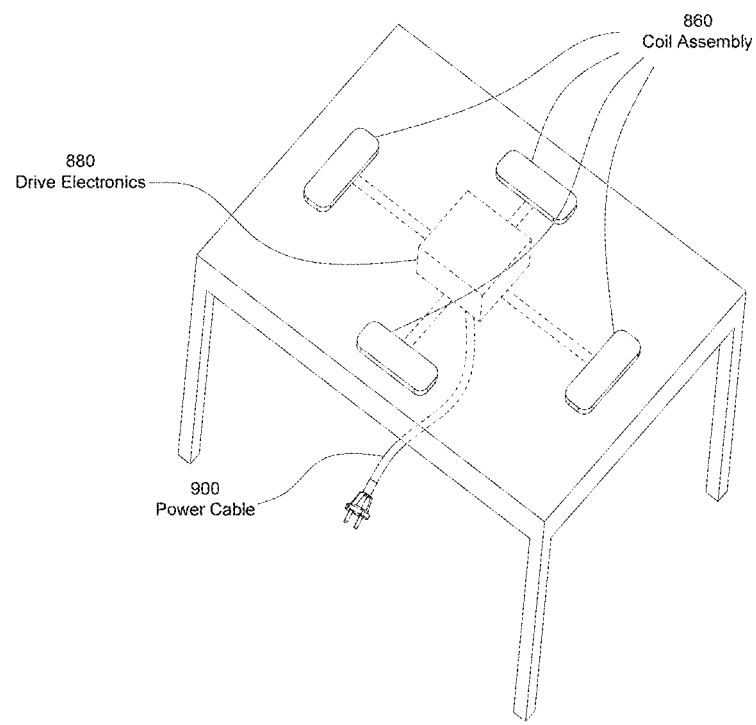
FIG. 21 is a simplified diagram illustrating an exemplary table, counter or surface with one or more charger or power supply coil assemblies and a centralized driver electronics or charger control unit according to some embodiments of the present disclosure.

In an embodiment shown in FIG. 21 for installation of wireless chargers in a table, counter, surface or conference room setting with one or multiple chargers, the multiple charger coil assemblies 860 are placed or attached on the surface of the table or counter and the cable between the coil assembly and the drive or control electronics 880 is passed through a small opening or hole in the surface to the underside of the surface and the multiple chargers may be connected to one central drive or control electronics that is designed to drive, communicate and operate the coil assembly and electronics within the coil assembly. The electronics within the drive or control electronics housing may comprise a single electronics or PCB designed to drive multiple coil assemblies independently or be designed to be modular so that depending on the number of coil assemblies to be driven, additional electronics or PCBs can be added as needed. Such a modular approach has the advantage that a base drive or control electronics housing comprising a power rail and connectors for plugging in of multiple drive electronics PCBs can be provided and the user can purchase and add the number of drive electronics needed for the particular installation as needed. As described earlier, the cable connecting the coil assembly to the drive electronics housing may be connectorized at the housing end, the coil assembly end or both to allow simple plug and play installation. The drive or control electronics may be attached to the under surface of the table or counter or surface, etc. and be powered by a DC power source, battery or other power source or directly by an AC source, etc. simplifying the connectivity and installation of such a system compared to typical individual charger/coil devices. In a typical application the coil assembly may be attached permanently or semi-permanently or simply placed on the top surface. However, it is possible to attach the coil assembly to the bottom of the table or surface or the thinned backside of the table to allow efficient charging of devices on top. In cases where the charger is placed below the top surface, it is necessary to indicate to the user where to place the device. This can be achieved by creating a signage, visual cue or texture or material contrast on the surface to indicate this area. As an alternative, an active lighting LED or electroluminescent signage or logo or advertisement, etc. can be done to achieve this.

In an embodiment, the cable from the coil assembly is designed to exit from underneath the coil assembly so that in cases where the coil assembly is attached to the top surface, an aperture, hole or opening on the surface under where the coil assembly is attached or placed is sufficient to pass the cable through and to have the coil assembly cover this area when it is attached or placed on the surface. In this manner, the cable is not visible and only a thin pad (<1-10 mm thick) on the top surface is seen. In another embodiment, the top surface of the table or surface can be carved/milled or manufactured to allow for a depression or recessed area where the pad can be placed so the top surface of the furniture is flat and no protrusions or depressions on the surface due to the charger pads are created. In another embodiment, the charger pads may be placed in the recessed area and a cover may be installed to cover the section with the charger pad or identify the area for the user as a charger section. For any of these top surface installations, it is preferable to have the cable attaching the coil assembly to the electronic drive to be connectorized so that a small opening in the surface is sufficient to pass the cable to under the surface and the modification to the surface is minimized.

Separating the drive electronics from the coil assembly has many other advantages in practical applications. In addition to the thermal benefits and installation simplification described above, the robustness of the system to liquid spills, ease of cleaning and general better user experience are significant factors in this design. In addition, in case of failure of the coil assembly or the drive electronics section, these can be exchanged independently without the other one, lowering the maintenance cost of the deployed system. In public use cases where vandalism or theft may also be an issue, typically only the coil assembly is exposed and can easily be replaced if damaged or stolen.

In an embodiment, the coil assemblies may be able to support different power levels and/or functions or operate with different protocols or using Near Field or Far Field wireless charging. The drive electronics for these coil assemblies may be housed in the same housing or enclosure and connectorized to different pads as necessary or different drive electronics housings may be used to support the different variety of the coil assemblies.

Figure 22:
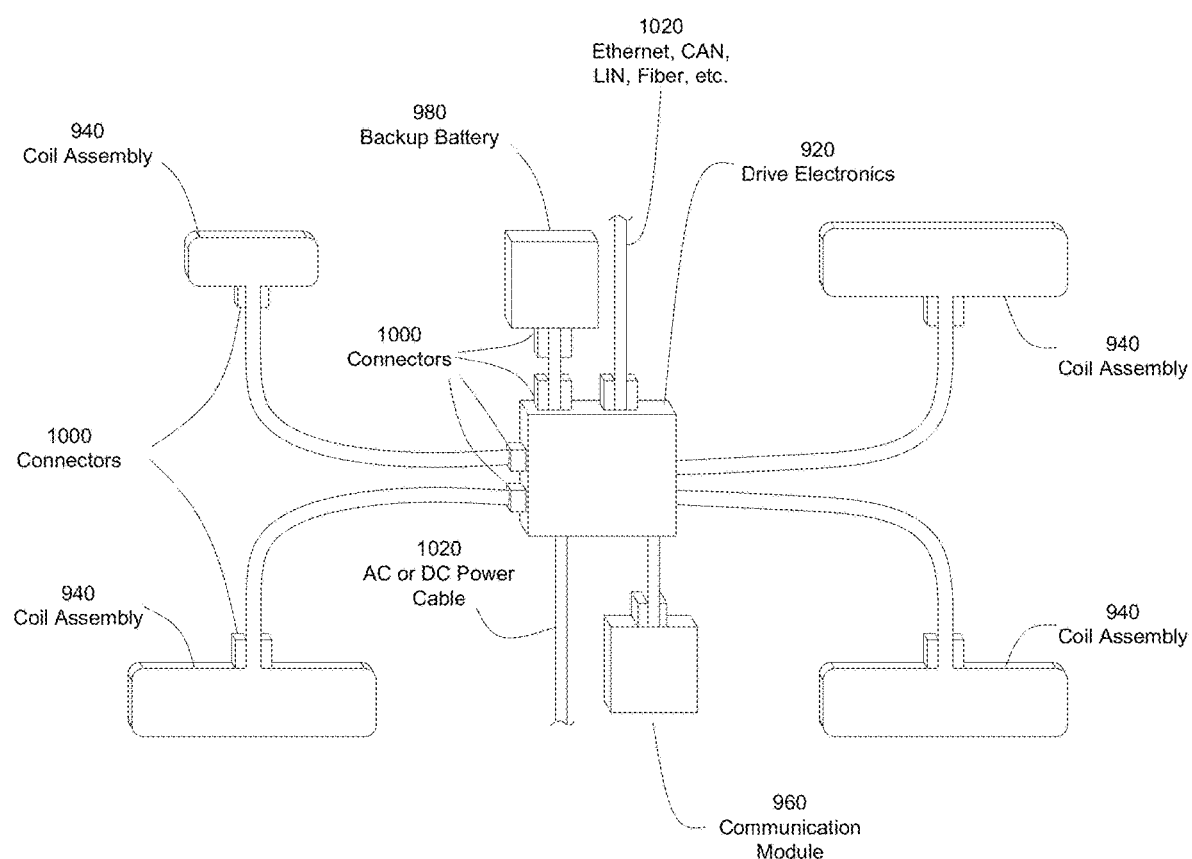
FIG. 22 is a simplified diagram illustrating an exemplary wireless charger or power supply comprising one or more coil assemblies or charging surfaces of different size, shape and capability and optional wireless or wired communication units and back up battery and a centralized driver electronics or charger control unit according to some embodiments of the present disclosure.

In an embodiment shown in FIG. 22, the drive electronics 920 for one or several coil assemblies 940 is designed to be modular and support additional functionalities that may include data connectivity to the internet or a local or remote computer or microcontroller through Ethernet, CAN, LAN, Fiber, SPI, USB, I$^2$c, lightning, or other wired communication protocol or WiFi, Bluetooth, Zigbee, 3G, 4G, 5G, etc. protocols through a communication module 960. The data communicated may involve remote turn-on or turn-off of the drive electronics and the wireless chargers, monitoring of the state of health of the chargers, identification and validation of the users for charging, data communication between devices being charged and a local area or wide area network or over internet or identification of the users and setting the local environmental or data preferences according to pre-defined or ad-hoc rules defined by the user. In addition, local back up battery 980 to allow charging and power transfer in case of outage or to allow the unit to be mobile may be incorporated. For example, in environments where a roving table or pedestal for wireless charging or powering of mobile or stationary devices is needed, it would be advantageous to have a local rechargeable battery incorporated that can be charged periodically through a wired or wireless method and can in turn power the drive electronics for wireless charging. In addition, the charging of this back up battery can be through an electric outlet, or solar cells, fuel cells, hand or motorized generators, etc. for cases where a local power source is not readily available. The modules described here for wired or wireless communication, battery back-up, power source, etc. may be incorporated into the same drive electronics housing and be designed to be plugged to a base platform to add functionality as needed or can be external to the drive electronics housing and be connected with connectors 1000 to each other or to the local area network, Ethernet, CAN, Lin, or Fiber connection 1020 or be permanently connected or added as needed.

Figure 23:
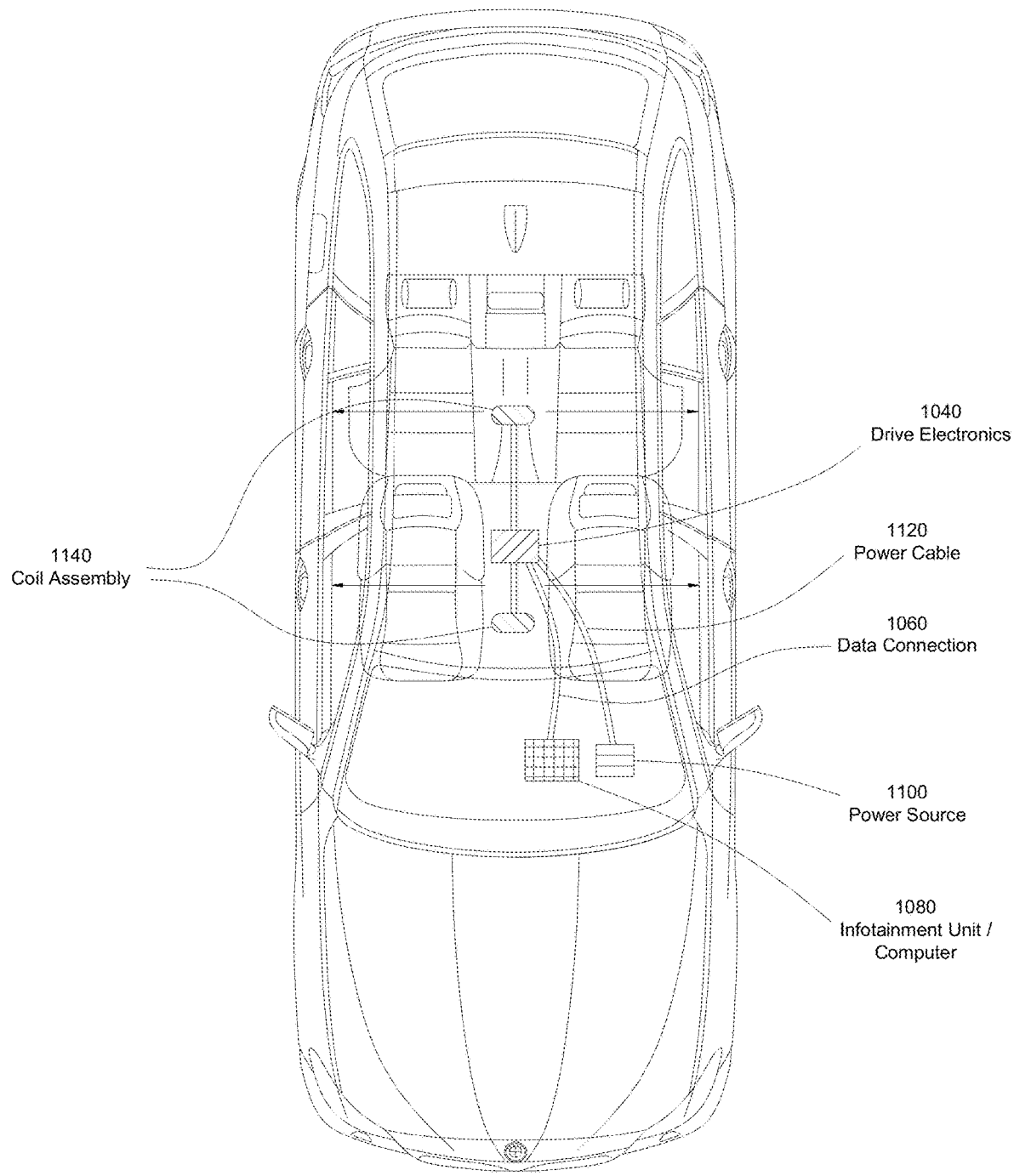
FIG. 23 is a simplified diagram illustrating an exemplary wireless charger or power supply in a vehicle or auto comprising one or more coil assemblies of different size, shape and capability and optional wireless or wired communication units or communication with the vehicle communication network and infotainment center and a centralized driver electronics or charger control unit according to some embodiments of the present disclosure.

In another embodiment shown in FIG. 23, in a transport or automotive environment, the charger driver electronics 1040 or control electronics in addition to NFC detector or communicator, thermal sensor circuit, may contain circuits for driving and controlling near field or far field power transfer, wireless (WiFi, Bluetooth, Zigbee, 3G, 4G, 5G, etc.) and wired and fiber communication circuits and software/firmware and methods for communicating with the automobile through Controller Area Network (CAN bus) or Local Interconnect Network (LIN) communication networks through a data connection 1060 to the auto infotainment unit (radio, video, navigation and communication) and/or the automobile computer or processor 1080 and air-conditioner and other comfort or safety systems. The driver electronics or the charger controller in this case may also contain circuitry to condition and control the 12-16 V from the vehicle power source 1100 to one or more constant and regulated voltage and current levels used by the unit through a power cable 1120. Many features and additional functionalities can be implemented with such an integration. For example, once a driver or passenger enters a vehicle and places a phone or other device on one or more coil assemblies 1140 controlled by the drive electronics or control unit, the vehicle can recognize the user and show his or her name on the infotainment system and proceed to implement a series of adjustments that the user has pre-programmed on the vehicle or an application on their phone. For example, their contact list may download or become visible, their favorite radio station or music can start playing and the seat and mirrors can adjust to their required position. The air conditioner and seat heating/cooling etc. can also be activated to their preference. In addition, as discussed above, if the radio is tuned to a station with frequency that may interfere with the frequency of operation of the wireless charger, the charger frequency may be changed to eliminate such an interference, or the charger may be stopped or shut off if the frequency change can not be achieved. In another embodiment, to minimize power use (especially in electric vehicles where power use is critical), the charger may be shut off completely and no power drawn until the vehicle's central processor signals that the charger can turn on or begin pinging or searching for phones and in cases where the vehicle battery is low, unnecessary activities such as charging can be shut down. In addition, instead of pinging periodically, a lower power method such as detection by NFC, Bluetooth or RFID, etc. may be implemented to reduce power use. As discussed above, the charger driver or controller may be combined with the coil assembly or be separated to provide better thermal and/or user or installation benefits. The coil assembly, in addition to one or multiple coils and ferrites/metallic layers, may contain thermistors, thermocouples, near field and far field antennas, NFC or WiFi antennas, mobile device boost antennas and/or electronics, and heat and EMI reduction or elimination components (as described above) etc. The Coil Assembly may be connected by a permanent or connectorized cable to the driver electronics or the charger controller and can be near or far from each other. In an embodiment, one central driver electronics or charger controller is installed at a convenient location in the vehicle and the connect to the power source, the CAN/LIN buses and the infotainment and comfort systems or car computer. The driver electronics or the charge controller is then connected to operate or drive one or more coil assemblies placed at required locations in the vehicle. It may be possible to even drive one or multiple coil assemblies by one centralized Integrated Circuit (IC) or Application Specific Integrated Circuit (ASIC) that contains a microcontroller or computer, communication circuits, switching gate drivers, digital to analog and analog to digital converters, comparators, and buck/boost or analog voltage converters to reduce cost and complexity of the circuit. By centralizing such a driver electronics or the charge controller connected to the vehicle network and infotainment system in one location and connecting and driving multiple coil assemblies, a great amount of reduction in complexity of the system, cost and weight/connectivity can be achieved.

The above description and embodiments are not intended to be exhaustive, and are instead intended to only show some examples of the rich and varied products and technologies that can be envisioned and realized by various embodiments. It will be evident to persons skilled in the art that these and other embodiments can be combined to produce combinations of above techniques, to provide useful effects and products.

Some aspects of embodiments of the present invention can be conveniently implemented using a conventional general purpose or a specialized digital computer, microprocessor, or electronic circuitry programmed according to the teachings of the present disclosure. Appropriate software coding can readily be prepared by skilled programmers and circuit designers based on the teachings of the present disclosure, as will be apparent to those skilled in the art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An inductive charger for transmitting power to an inductive receiver of an electronic device for charging the electronic device, the inductive charger comprising:
   a first enclosure comprising metal and having an electrically non-conductive charging surface on a side of the first enclosure, the first enclosure comprising:
      an inductive charging coil positioned behind the charging surface within the first enclosure,
         wherein the inductive charging coil comprises a spiral-shaped metallic Litz wire conductor that defines two charging coil terminals,
         wherein the inductive charging coil has a first side that faces the charging surface and a second side that faces away from the charging surface opposite the first side, and
         wherein the inductive charging coil is configured to transmit electromagnetic power by inductive power transfer through the charging surface of the enclosure with an alternating magnetic field at an operating frequency when an electronic device is positioned in proximity to the charging surface; and
   a metallic second enclosure physically separated from the first enclosure, the second enclosure comprising:
      a drive circuit and a resonant capacitor electrically coupled to the inductive charging coil in the first enclosure to drive the inductive charging coil with an alternating current; and
      a microcontroller electrically coupled to the drive circuit, wherein the microcontroller is configured to:
         detect a received communication of information in a current or voltage modulation of the inductive charger coil by the inductive receiver; and
         control the transmission of power during inductive power transfer; and
   a shielded electrical cable that electrically couples the first enclosure and the second enclosure,
      wherein the shielded electrical cable comprises two and only two sets of twisted wires coupling the drive circuit in the second enclosure to the two charging coil terminals of the inductive charging coil in the first enclosure to drive the inductive charging coil and to receive the communication of information from the inductive charging coil,
   wherein each set of the two sets of twisted wires comprises multiple electrical wires to reduce electrical loss, and
   wherein the shielded electrical cable comprises a metallic shield that covers the two sets of twisted wires and is coupled to an electrical ground;
   wherein the second enclosure is not within the first enclosure.

2. The inductive charger of claim 1, wherein the charging surface comprises a polymer and a thermally conductive additive to increase the polymer's thermal conductivity.

3. The inductive charger of claim 1, further comprising a first shield having a thermally conductive carbon-based layer positioned between the first side of the inductive charging coil and the charging surface of the first enclosure such that the first shield covers the inductive charging coil, wherein the transmission of electromagnetic power through the first shield is allowed at the operating frequency for inductive power transfer.

4. The inductive charger of claim 1, further comprising a second shield having an electrically conductive metal layer positioned between the first side of the inductive charging coil and the charging surface of the first enclosure such that the second shield covers the inductive charging coil, wherein the metal layer has a periodic pattern and wherein the transmission of electromagnetic power through the second shield is allowed at the operating frequency for inductive power transfer.

5. The inductive charger of claim 4, wherein the second shield further comprises a non-metallic thermally conductive layer.

6. The inductive charger of claim 5, wherein the thermally conductive layer comprises graphite.

7. The inductive charger of claim 1, wherein the shielded electrical cable comprises a metal foil layer and a metal coated polymer covering the two sets of twisted wires.

8. The inductive charger of claim 7, wherein the shielded electrical cable has a length greater than or equal to 3 centimeters.

9. The inductive charger of claim 8, wherein the two sets of twisted wires are Litz wires selected for low loss transmission of current at the operating frequency.

10. The inductive charger of claim 7, wherein the shielded electrical cable has a length greater than or equal to 50 centimeters.

11. The inductive charger of claim 1, further comprising a far-field charger system and a far-field antenna for far-field power transfer frequency of over 1 GHz to provide power to an electronic device positioned at a distance from the charging surface of the inductive charger.

12. The inductive charger of claim 1, wherein the shielded electrical cable has a length greater than or equal to 3 centimeters.

13. The inductive charger of claim 1, wherein the shielded electrical cable has a length greater than or equal to 10 centimeters.

14. The inductive charger of claim 1, wherein the inductive charger has an operating frequency within a frequency range of 100 kHz to 1 MHz.

15. The inductive charger of claim 1, wherein the shielded electrical cable further includes a wire distinct from the two sets of twisted wires for sensing a temperature of a component within the first enclosure by the microcontroller.

16. The inductive charger of claim 1, wherein the electrical wires from one of the two sets of the twisted wires are twisted with electrical wires from the other set of the twisted wires to form a twisted pair.

17. An inductive charger for transmitting power to an inductive receiver of an electronic device for charging the electronic device, the inductive charger comprising:
   a first enclosure comprising metal and having an electrically non-conductive charging surface on a side of the first enclosure, the first enclosure comprising:
      an inductive charging coil positioned behind the charging surface within the first enclosure,
         wherein the inductive charging coil comprises a spiral-shaped metallic Litz wire conductor that defines two charging coil terminals,
         wherein the inductive charging coil has a first side that faces the charging surface and a second side that faces away from the charging surface opposite the first side, and
         wherein the inductive charging coil is configured to transmit electromagnetic power by inductive power transfer through the charging surface of the enclosure with an alternating magnetic field at an operating frequency when an electronic device is positioned in proximity to the charging surface; and a metallic second enclosure physically separated from the first enclosure, the second enclosure comprising:
   a drive circuit and a resonant capacitor electrically coupled to the inductive charging coil in the first enclosure to drive the inductive charging coil with an alternating current; and
   a microcontroller electrically coupled to the drive circuit, wherein the microcontroller is configured to:
      detect a received communication of information in a current or voltage modulation of the inductive charger coil by the inductive receiver; and
      control the transmission of power during inductive power transfer; and
a shielded electrical cable means that electrically couples the first enclosure and the second enclosure,
   wherein the shielded electrical cable means comprises two and only two sets of twisted wires coupling the drive circuit in the second enclosure to the two charging coil terminals of the inductive charging coil in the first enclosure to drive the inductive charging coil and to receive the communication of information from the inductive charging coil,
   wherein each set of the two sets of twisted wires comprises multiple electrical wires to reduce electrical loss, and
   wherein the shielded electrical cable means comprises a metallic shield that covers the two sets of twisted wires and is coupled to an electrical ground;
wherein the second enclosure is not within the first enclosure.

18. The inductive charger of claim 17, wherein the charging surface comprises a polymer and a thermally conductive additive to increase the polymer's thermal conductivity.

19. The inductive charger of claim 17, further comprising a first shield having a thermally conductive carbon-based layer positioned between the first side of the inductive charging coil and the charging surface of the first enclosure such that the first shield covers the inductive charging coil, wherein the transmission of electromagnetic power through the first shield is allowed at the operating frequency for inductive power transfer.

20. The inductive charger of claim 17, further comprising a second shield having an electrically conductive metal layer positioned between the first side of the inductive charging coil and the charging surface of the first enclosure such that the second shield covers the inductive charging coil, wherein the metal layer has a periodic pattern and wherein the transmission of electromagnetic power through the second shield is allowed at the operating frequency for inductive power transfer.

21. The inductive charger of claim 20, wherein the second shield further comprises a non-metallic thermally conductive layer.

22. The inductive charger of claim 21, wherein the thermally conductive layer comprises graphite.

23. The inductive charger of claim 17, wherein the shielded electrical cable means comprises a metal foil layer and a metal coated polymer covering the two sets of twisted wires.

24. The inductive charger of claim 23, wherein the shielded electrical cable means has a length greater than or equal to 3 centimeters.

25. The inductive charger of claim 24, wherein the two sets of twisted wires are Litz wires selected for low loss transmission of current at the operating frequency.

26. The inductive charger of claim 23, wherein the shielded electrical cable means has a length of greater than or equal to 50 centimeters.

27. The inductive charger of claim 17, wherein the shielded electrical cable means has a length greater than or equal to 10 centimeters.

28. The inductive charger of claim 17, wherein the inductive charger has an operating frequency within a frequency range of 100 kHz to 1 MHz.

29. The inductive charger of claim 17, wherein the shielded electrical cable means further includes a wire distinct from the two sets of twisted wires for sensing a temperature of a component within the first enclosure by the microcontroller.

30. The inductive charger of claim 17, wherein the electrical wires from one of the two sets of twisted wires are twisted with electrical wires from the other set of the twisted wires to form a twisted pair.

31. An inductive charger for transmitting power to an inductive receiver of an electronic device for charging the electronic device, the inductive charger comprising:
a first enclosure having an electrically non-conductive charging surface on a side of the first enclosure, the first enclosure comprising:
   an inductive charging coil positioned behind the charging surface within the first enclosure,
      wherein the inductive charging coil comprises a spiral-shaped metallic Litz wire conductor that defines two charging coil terminals,
      wherein the inductive charging coil has a first side that faces the charging surface and a second side that faces away from the charging surface opposite the first side, and
      wherein the inductive charging coil is configured to transmit electromagnetic power by inductive power transfer through the charging surface of the enclosure with an alternating magnetic field at an operating frequency when an electronic device is positioned in proximity to the charging surface; and
a metallic second enclosure physically separated from the first enclosure, the second enclosure comprising:
   a drive circuit and a resonant capacitor electrically coupled to the inductive charging coil in the first enclosure to drive the inductive charging coil with an alternating current; and
   a microcontroller electrically coupled to the drive circuit, wherein the microcontroller is configured to:
      detect a received communication of information in a current or voltage modulation of the inductive charger coil by the inductive receiver; and
      control the transmission of power during inductive power transfer; and
a shielded electrical cable that electrically couples the first enclosure and the second enclosure,
   wherein the shielded electrical cable comprises two and only two sets of twisted wires coupling the drive circuit in the second enclosure to the two charging coil terminals of the inductive charging coil in the first enclosure to drive the inductive charging coil and to receive the communication of information from the inductive charging coil,
   wherein each set of the two sets of twisted wires comprises multiple electrical wires to reduce electrical loss, and wherein the shielded electrical cable comprises a metallic shield that covers the two sets of twisted wires and is coupled to an electrical ground;

wherein the second enclosure is not within the first enclosure.

32. The inductive charger of claim 31, wherein the charging surface comprises a polymer and a thermally conductive additive to increase the polymer's thermal conductivity.

33. The inductive charger of claim 31, wherein the electrical wires from one of the two sets of twisted wires are twisted with electrical wires from the other set of the twisted wires to form a twisted pair.

34. The inductive charger of claim 31, wherein the shielded electrical cable comprises a metal foil layer and a metal coated polymer covering the two sets of twisted wires.

35. The inductive charger of claim 34, wherein the shielded electrical cable has a length greater than or equal to 3 centimeters.

36. The inductive charger of claim 31, wherein the shielded electrical cable has a length greater than or equal to 10 centimeters.

37. The inductive charger of claim 31, wherein the inductive charger has an operating frequency within a frequency range of 100 kHz to 1 MHz.

38. The inductive charger of claim 31, wherein the shielded electrical cable further includes a wire distinct from the two sets of twisted wires for sensing a temperature of a component within the first enclosure by the microcontroller.

39. An inductive charger for transmitting power to an inductive receiver of an electronic device for charging the electronic device, the inductive charger comprising:
a first enclosure having an electrically non-conductive charging surface on a side of the first enclosure, the first enclosure comprising:
an inductive charging coil positioned behind the charging surface within the first enclosure,
wherein the inductive charging coil comprises a spiral-shaped metallic Litz wire conductor that defines two charging coil terminals,
wherein the inductive charging coil has a first side that faces the charging surface and a second side that faces away from the charging surface opposite the first side, and
wherein the inductive charging coil is configured to transmit electromagnetic power by inductive power transfer through the charging surface of the enclosure with an alternating magnetic field at an operating frequency when an electronic device is positioned in proximity to the charging surface; and
a metallic second enclosure physically separated from the first enclosure, the second enclosure comprising:
a drive circuit and a resonant capacitor electrically coupled to the inductive charging coil in the first enclosure to drive the inductive charging coil with an alternating current; and
a microcontroller electrically coupled to the drive circuit, wherein the microcontroller is configured to:
detect a received communication of information in a current or voltage modulation of the inductive charger coil by the inductive receiver; and
control the transmission of power during inductive power transfer; and
a shielded electrical cable means that electrically couples the first enclosure and the second enclosure, wherein the shielded electrical cable means comprises two and only two sets of twisted wires coupling the drive circuit in the second enclosure to the two charging coil terminals of the inductive charging coil in the first enclosure to drive the inductive charging coil and to receive the communication of information from the inductive charging coil, wherein each set of the two sets of twisted wires comprises multiple electrical wires to reduce electrical loss, and wherein the shielded electrical cable means comprises a metallic shield that covers the two sets of twisted wires and is coupled to an electrical ground;

wherein the second enclosure is not within the first enclosure.

40. The inductive charger of claim 39, wherein the charging surface comprises a polymer and a thermally conductive additive to increase the polymer's thermal conductivity.

41. The inductive charger of claim 39, wherein the shielded electrical cable means comprises a metal foil layer and a metal coated polymer covering the two sets of twisted wires.

42. The inductive charger of claim 41, wherein the shielded electrical cable means has a length of greater than or equal to 3 centimeters.

43. The inductive charger of claim 41, wherein the shielded electrical cable means has a length greater than or equal to 50 centimeters.

44. The inductive charger of claim 39, wherein the inductive charger has an operating frequency within a frequency range of 100 kHz to 1 MHz.

45. The inductive charger of claim 39, wherein the shielded electrical cable means further includes a wire distinct from the two sets of twisted wires for sensing a temperature of a component within the first enclosure by the microcontroller.

46. The inductive charger of claim 39, wherein the electrical wires from one of the two sets of twisted wires are twisted with electrical wires from the other set of the twisted wires to form a twisted pair.

47. An inductive charger for transmitting power to an inductive receiver of an electronic device for charging the electronic device, the inductive charger comprising:
a first enclosure comprising metal and having an electrically non-conductive charging surface on a side of the first enclosure, the first enclosure comprising:
an inductive charging coil positioned behind the charging surface within the first enclosure,
wherein the inductive charging coil comprises a spiral-shaped Printed Circuit Board (PCB) coil with two charging coil terminals,
wherein the inductive charging coil has a first side that faces the charging surface and a second side that faces away from the charging surface opposite the first side, and
wherein the inductive charging coil is configured to transmit electromagnetic power by inductive power transfer through the charging surface of the enclosure with an alternating magnetic field at an operating frequency when an electronic device is positioned in proximity to the charging surface; and
a metallic second enclosure physically separated from the first enclosure, the second enclosure comprising:

a drive circuit and a resonant capacitor electrically coupled to the inductive charging coil in the first enclosure to drive the inductive charging coil with an alternating current; and a microcontroller electrically coupled to the drive circuit, wherein the microcontroller is configured to:
    detect a received communication of information in a current or voltage modulation of the inductive charger coil by the inductive receiver; and
    control the transmission of power during inductive power transfer; and a shielded electrical cable that electrically couples the first enclosure and the second enclosure,
    wherein the shielded electrical cable comprises two and only two sets of twisted wires coupling the drive circuit in the second enclosure to the two charging coil terminals of the inductive charging coil in the first enclosure to drive the inductive charging coil and to receive the communication of information from the inductive charging coil,
    wherein each set of the two sets of twisted wires comprises multiple electrical wires to reduce electrical loss, and
    wherein the shielded electrical cable comprises a metallic shield that covers the two sets of twisted wires and is coupled to an electrical ground;

wherein the second enclosure is not within the first enclosure.

48. The inductive charger of claim 47, further comprising a first shield having an electrically conductive metal layer positioned between the first side of the inductive charging coil and the charging surface of the first enclosure such that the first shield covers the inductive charging coil, wherein the metal layer has a periodic pattern and wherein the transmission of electromagnetic power through the first shield is allowed at the operating frequency for inductive power transfer.

49. The inductive charger of claim 47, wherein the shielded electrical cable comprises a metal foil layer and a metal coated polymer covering the two sets of twisted wires.

50. The inductive charger of claim 49, wherein the shielded electrical cable has a length greater than or equal to 3 centimeters.

51. The inductive charger of claim 50, wherein the two sets of twisted wires are Litz wires selected for low loss transmission of current at the operating frequency.

52. The inductive charger of claim 49, wherein the shielded electrical cable has a length of greater than or equal to 50 centimeters.

53. The inductive charger of claim 47, wherein the electrical wires from one of the two sets of twisted wires are twisted with electrical wires from the other set of the twisted wires to form a twisted pair.

* * * * *